US012811044B2

(12) United States Patent
Rasmussen et al.

(10) Patent No.: US 12,811,044 B2
(45) Date of Patent: Nov. 24, 2026

(54) BIMODAL MAGNETIC ALIGNMENT COMPONENTS FOR ALIGNMENT OF DEVICES

(71) Applicant: Apple Inc., Cupertino, CA (US)

(72) Inventors: Timothy J. Rasmussen, San Jose, CA (US); Eric S. Jol, San Jose, CA (US); Christopher S. Graham, San Francisco, CA (US); Karl Ruben Fredrik Larsson, San Jose, CA (US); Eric X. Zhou, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/662,415

(22) Filed: May 6, 2022

(65) Prior Publication Data

US 2022/0416590 A1 Dec. 29, 2022

Related U.S. Application Data

(60) Provisional application No. 63/202,756, filed on Jun. 23, 2021.

(51) Int. Cl.
*H01F 7/02* (2006.01)
*H02J 50/90* (2016.01)

(52) U.S. Cl.
CPC ......... *H01F 7/0221* (2013.01); *H01F 7/0242* (2013.01); *H02J 50/90* (2016.02)

(58) Field of Classification Search
CPC ...... H01F 7/0221; H01F 7/0242; H01F 38/14; H02J 50/90
See application file for complete search history.

(56) References Cited

U.S. PATENT DOCUMENTS 4,758,813 A * 7/1988 Holsinger ............ G01R 33/383 324/318
5,909,100 A 6/1999 Watanabe et al.
(Continued)

FOREIGN PATENT DOCUMENTS

CN 111384750 A 7/2020
CN 212304889 U 1/2021
(Continued)

OTHER PUBLICATIONS

Application No. PCT/US2022/029246, International Search Report, Mailed on Jan. 5, 2023, 4 pages.
(Continued)

*Primary Examiner* — Mohamad A Musleh
(74) *Attorney, Agent, or Firm* — Kilpatrick Townsend & Stockton LLP

(57) ABSTRACT

A bimodal annular magnetic alignment component can be included in an electronic device that attaches to other electronic devices using a magnetic alignment system that includes a primary annular alignment component and a secondary annular alignment component having complementary (and fixed) magnetic orientations. In a bimodal alignment component, a set of alignment magnets can be reoriented or shifted between a first position in which a magnetic orientation of the bimodal alignment component is complementary to a primary annular alignment component and a second position in which a magnetic orientation of the bimodal alignment component is complementary to a secondary annular alignment component. A bimodal electronic device incorporating a bimodal alignment component can be interchangeably attached to another device via either a primary annular alignment component or a secondary annular alignment component.

6 Claims, 19 Drawing Sheets

(56) References Cited

U.S. PATENT DOCUMENTS

| | | | |
|---|---|---|---|
| 9,099,867 | B2 | 8/2015 | Park |
| 10,273,942 | B2 | 4/2019 | Nakamura |
| 10,725,515 | B2 | 7/2020 | Marshall et al. |
| 10,938,251 | B1 | 3/2021 | Mehrabi et al. |
| 2012/0146576 | A1 | 6/2012 | Partovi |
| 2013/0249308 | A1 | 9/2013 | Yeh |
| 2015/0325352 | A1 | 11/2015 | Lowe |
| 2017/0093087 | A1 | 3/2017 | Esmaeili et al. |
| 2017/0170678 | A1 | 6/2017 | Uhm et al. |
| 2017/0257147 | A1 | 9/2017 | Szeto |
| 2018/0069600 | A1 | 3/2018 | Kowalski et al. |
| 2019/0006885 | A1 | 1/2019 | Danilovic |
| 2021/0099027 | A1 | 4/2021 | Larsson et al. |
| 2021/0099031 | A1 | 4/2021 | Jol et al. |
| 2021/0111591 | A1 | 4/2021 | Chaudhri et al. |
| 2022/0166868 | A1 | 5/2022 | Whitten et al. |
| 2022/0311287 | A1 | 9/2022 | Yin et al. |

FOREIGN PATENT DOCUMENTS

| | | | |
|---|---|---|---|
| CN | 112398231 | A | 2/2021 |
| CN | 112771756 | A | 5/2021 |
| CN | 112865343 | A | 5/2021 |
| CN | 221552845 | U | 8/2024 |
| JP | 3183355 | U | 5/2013 |
| KR | 20210037577 | A | 4/2021 |
| WO | 2012152980 | A | 11/2012 |

OTHER PUBLICATIONS

"Office Action," mailed Feb. 13, 2024 in Korean Application No. 1020220065980. 9 pages (English translation).

Non-Final Office Action issued in U.S. Appl. No. 17/731,094, dated May 28, 2025 in 53 pages.

Final Office Action issued in U.S. Appl. No. 17/731,094, dated Jul. 29, 2025 in 17 pages.

Notice of Allowance issued in U.S. Appl. No. 17/731,094, dated Oct. 15, 2025 in 7 pages.

Office Action issued in China Application No. CN202210606304.7, dated Nov. 27, 2025 in 8 pages.

First Examination Report issued in India Application No. IN202214030570, dated Mar. 26, 2025 in 7 pages.

Korean Patent Application No. 10-2022-0065980 , Office Action, Mailed on Dec. 13, 2024, 4 pages.

* cited by examiner

BIMODAL MAGNETIC ALIGNMENT COMPONENTS FOR ALIGNMENT OF DEVICES

CROSS-REFERENCE TO RELATED APPLICATION

This application claims the benefit of U.S. Provisional Application No. 63/202,756, filed Jun. 23, 2021, the disclosure of which is incorporated herein by reference.

BACKGROUND

The present disclosure relates generally to consumer electronic devices and more particularly to magnetic alignment components and systems that facilitate establishing and maintaining a desired alignment between electronic devices, e.g., for purposes of enabling efficient wireless power transfer between the devices.

Portable electronic devices (e.g., mobile phones, media players, electronic watches, and the like) operate when there is charge stored in their batteries. Some portable electronic devices include a rechargeable battery that can be recharged by coupling the portable electronic device to a power source through a physical connection, such as through a charging cord. Using a charging cord to charge a battery in a portable electronic device, however, requires the portable electronic device to be physically tethered to a power outlet. Additionally, using a charging cord requires the mobile device to have a connector, typically a receptacle connector, configured to mate with a connector, typically a plug connector, of the charging cord. The receptacle connector includes a cavity in the portable electronic device that provides an avenue via which dust and moisture can intrude and damage the device. Further, a user of the portable electronic device has to physically connect the charging cable to the receptacle connector in order to charge the battery.

To avoid such shortcomings, wireless charging technologies have been developed that exploit electromagnetic induction to charge portable electronic devices without the need for a charging cord. For example, some portable electronic devices can be recharged by merely resting the device on a charging surface of a wireless charger device. A transmitter coil disposed below the charging surface is driven with an alternating current that produces a time-varying magnetic flux that induces a current in a corresponding receiver coil in the portable electronic device. The induced current can be used by the portable electronic device to charge its internal battery. Some portable electronic devices have been designed to not only receive power wirelessly but also to transmit power wirelessly to other portable electronic devices, such as accessory devices.

SUMMARY

Among other factors, the efficiency of wireless power transfer depends on the alignment between the transmitter and receiver coils. For instance, a transmitter coil and receiver coil may perform best when they are aligned coaxially. Where a portable electronic device has a flat surface with no guiding features, finding the proper alignment can be difficult. Often, alignment is achieved by trial and error, with the user shifting the relative positions of the device and charger and observing the effect on charging performance. Establishing optimal alignment in this manner can be time-consuming. Further, the absence of surface features can make it difficult to maintain optimal alignment.

For example, if the portable electronic device and/or charger are jostled during charging, they may be shifted out of alignment. For these and other reasons, some electronic devices include annular magnetic alignment components (e.g., surrounding the inductive coils) that can attract and hold a pair of devices in a desired alignment. Such magnetic alignment systems can include two types of alignment components, referred to herein as "primary" and "secondary." Each alignment component can include an annular (or ring-shaped) arrangement of magnets having a fixed arrangement of magnetic polarities such that alignment components of the two types attract each other. For instance, a primary alignment component can have a quad-pole magnetic configuration in which the inner and outer annular regions have magnetic polarity oriented in opposing axial directions, while a secondary alignment component can have a dipole magnetic configuration with a radial magnetic orientation. When brought into proximity with each other, the primary and secondary alignment components can generate a mutually attractive magnetic force that can draw the alignment components (and the devices in which the alignment components are installed) into the desired alignment and/or resist dislodgement from the desired alignment.

In magnetic alignment systems of this kind, alignment components of like type (two primary alignment components or two secondary alignment components) magnetically repel each other. This can make it difficult to provide a "bimodal" device that can interchangeably attach to devices having either type of magnetic alignment component. One option is to omit a magnetic alignment component from the bimodal device; however, a device without a magnetic alignment component cannot enjoy the advantages of magnetic alignment and attachment. Another option is to provide two separate magnetic alignment components (one primary and one secondary), but this may also entail providing additional inductive coils and/or other electronic components, all of which can add to the size, weight, and manufacturing costs of the device.

Certain embodiments of the present invention relate to bimodal alignment components that can be included in a bimodal device. In a bimodal alignment component, the alignment magnets can be reoriented or shifted between a first attachment position in which magnetic orientation of the alignment magnets is complementary to a primary annular alignment component and a second attachment position in which magnetic orientation of the alignment magnets is complementary to a secondary annular alignment component. Thus, a device incorporating a bimodal alignment component can be interchangeably attached to other devices via either a primary annular alignment component or a secondary annular alignment component.

The following detailed description, together with the accompanying drawings, will provide a better understanding of the nature and advantages of the claimed invention.

DETAILED DESCRIPTION

Described herein are various embodiments of magnetic alignment systems and components thereof. A magnetic alignment system can include annular alignment components, where each annular alignment component can comprise a ring of magnets (or a single annular magnet) having a particular magnetic orientation or pattern of magnetic orientations such that a "primary" annular alignment component can attract and hold a complementary "secondary" annular alignment component. Magnetic alignment components can be incorporated into a variety of devices, and a magnetic alignment component in one device can attract another device having a complementary magnetic alignment component into a desired alignment and/or hold the other device in a desired alignment. (Devices aligned by a magnetic alignment system may be said to be "attached" to each other.)

In embodiments described herein, a magnetic alignment system can also include a "bimodal" alignment component. In a bimodal alignment component, the alignment magnets can be reoriented or shifted between a first attachment position in which magnetic orientation of the alignment magnets is complementary to a primary annular alignment component and a second attachment position in which magnetic orientation of the alignment magnets is complementary to a secondary annular alignment component. Thus, a device incorporating a bimodal alignment component can be interchangeably attached to other devices via either a primary annular alignment component or a secondary annular alignment component in the other device.

1. Overview of Magnetic Alignment

Figure 1:
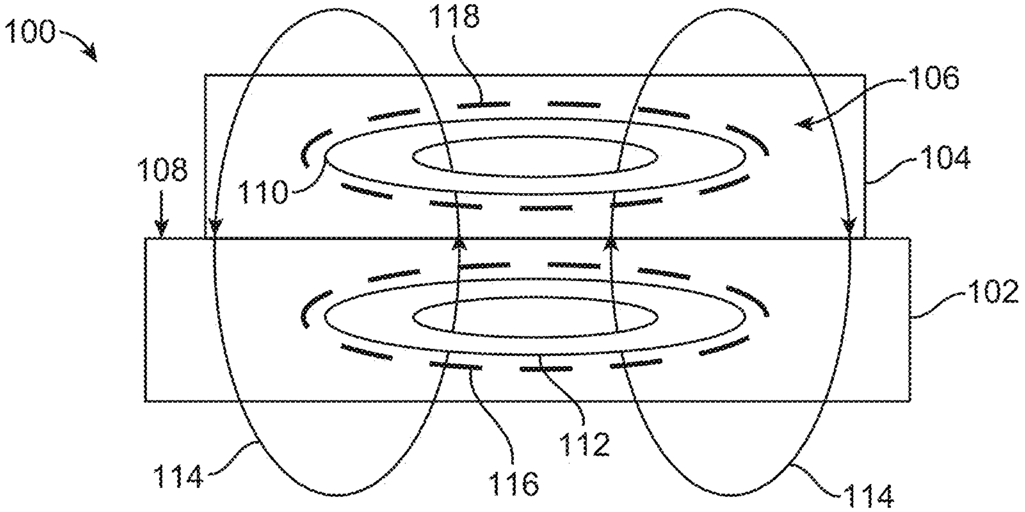
FIG. 1 shows a simplified representation of a wireless charging system incorporating a magnetic alignment system to which some embodiments of the invention have application.

FIG. 1 shows a simplified representation of a wireless charging system 100 incorporating a magnetic alignment system 106 to which some embodiments of the invention have application. A portable electronic device 104 is positioned on a charging surface 108 of a wireless charger device 102. Portable electronic device 104 can be a consumer electronic device, such as a smart phone, tablet computer, laptop computer, wearable device, or the like, or any other electronic device for which wireless charging is desired. Wireless charger device 102 can be any device that is configured to generate time-varying magnetic flux to induce a current in a suitably configured receiving device. For instance, wireless charger device 102 can be a wireless charging mat, puck, docking station, or the like. Wireless charger device 102 can include or have access to a power source such as battery power or standard AC power.

To enable wireless power transfer, portable electronic device 104 and wireless charger device 102 can include inductive coils 110 and 112, respectively, which can operate to transfer power between them. For example, inductive coil 112 can be a transmitter coil that generates a time-varying magnetic flux 114, and inductive coil 110 can be a receiver coil in which an electric current is induced in response to time-varying magnetic flux 114. The received electric current can be used to charge a battery of portable electronic device 104, to provide operating power to a component of portable electronic device 104, and/or for other purposes as desired. ("Wireless power transfer" and "inductive power transfer," as used herein, refer generally to the process of generating a time-varying magnetic field in a conductive coil of a first device that induces an electric current in a conductive coil of a second device.)

To enable efficient wireless power transfer, it is desirable to align inductive coils 112 and 110. According to some embodiments, magnetic alignment system 106 can provide such alignment. In the example shown in FIG. 1, magnetic alignment system 106 includes a primary alignment component 116 disposed within or on a surface of wireless charger device 102 and a secondary alignment component 118 disposed within or on a surface of portable electronic device 102. Primary and secondary alignment components 116 and 118 are configured to magnetically attract one another into an aligned position in which inductive coils 110 and 112 are aligned with one another to provide efficient wireless power transfer. (The terms "primary alignment component" and "secondary alignment component" are used herein to distinguish two types of alignment components having complementary magnetic orientations, and the association of "primary" and "secondary" alignment components with particular devices is arbitrary.)

A primary or secondary alignment component of a magnetic alignment system can be formed of arcuate magnets arranged in an annular configuration. In some embodiments, each magnet can have its magnetic polarity fixedly oriented in a desired direction so that magnetic attraction between the primary and secondary magnetic alignment components provides a desired alignment. In some embodiments, an arcuate magnet can include a first magnetic region with magnetic polarity oriented in a first direction and a second magnetic region with magnetic polarity oriented in a second direction different from (e.g., opposite to) the first direction.

Figure 2A:
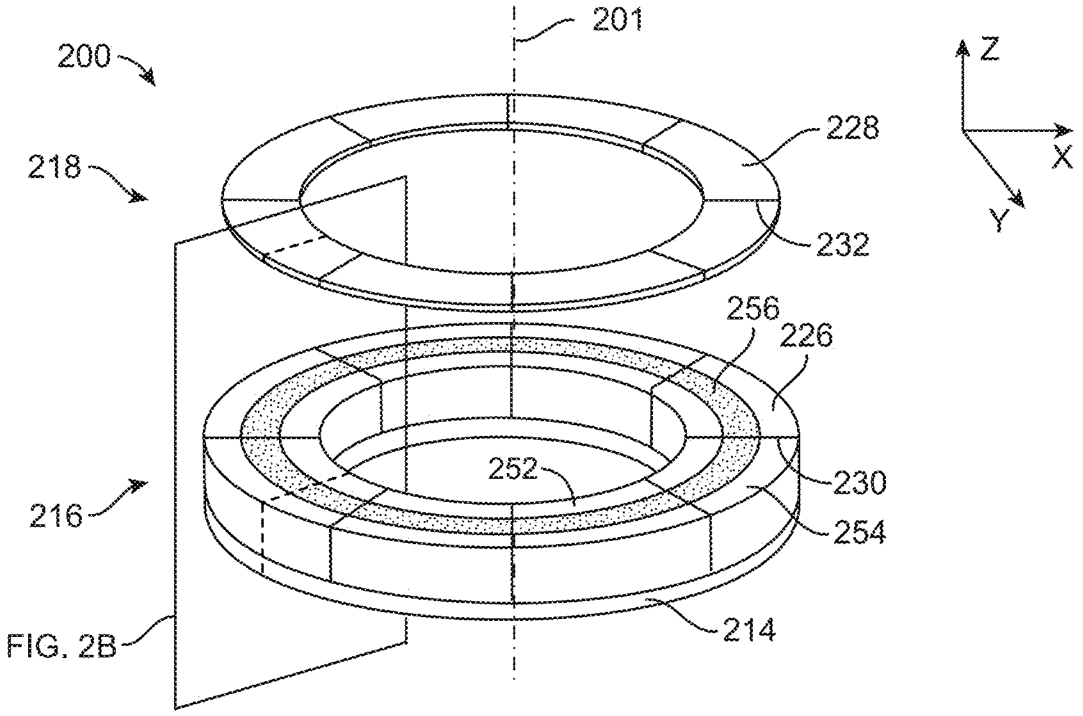
FIG. 2A shows a perspective view of a magnetic alignment system having a primary alignment component and a secondary alignment component.
Figure 2B:
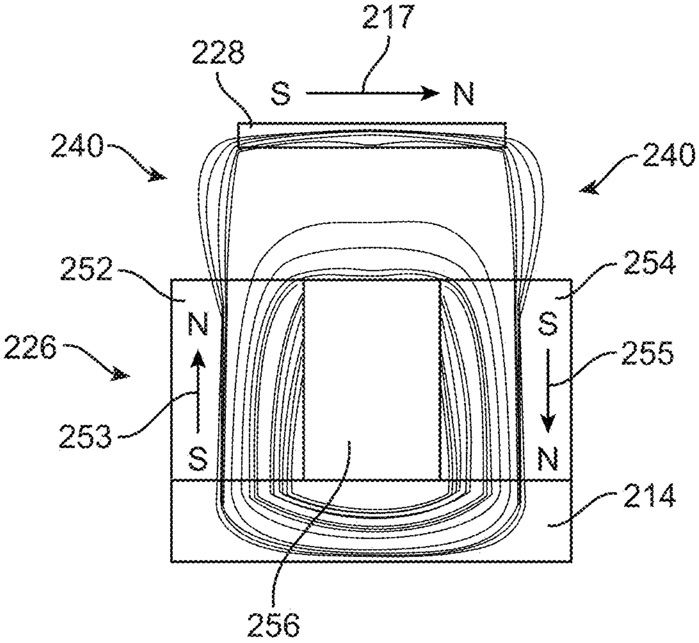
FIG. 2B shows a cross-section through magnetic alignment system across the cut plane indicated in FIG. 2A.

Further illustrating a structure for a magnetic alignment system, FIG. 2A shows a perspective view of a magnetic alignment system 200, and FIG. 2B shows a cross-section through magnetic alignment system 200 across the cut plane indicated in FIG. 2A. Magnetic alignment system 200 can be an implementation of magnetic alignment system 106 of FIG. 1. In magnetic alignment system 200, the alignment components have magnetic components configured in a "closed loop" configuration as described below. For convenience of description, an "axial" direction (also referred to as a "longitudinal" or "z" direction) is defined to be parallel to an axis 201 of rotational symmetry of magnetic alignment system 200, and a transverse plane (also referred to as a "lateral" or "xy" plane) is defined to be normal to axis 201. The term "proximal side" or "proximal surface" is used herein to refer to a side or surface of one alignment component that is oriented toward the other alignment component when the magnetic alignment system is aligned, and the term "distal side" or "distal surface" is used to refer to a side or surface opposite the proximal side or surface. (Terms such as "top" and "bottom" may be used in reference to a particular view shown in a drawing but have no other significance.)

As shown in FIG. 2A, magnetic alignment system 200 can include a primary alignment component 216 (which can be an implementation of primary alignment component 116 of FIG. 1) and a secondary alignment component 218 (which can be an implementation of secondary alignment component 118 of FIG. 1). Primary alignment component 216 and secondary alignment component 218 have annular shapes and may also be referred to as "annular" alignment components. The particular dimensions can be chosen as desired. In some embodiments, primary alignment component 216 and secondary alignment component 218 can each have an outer diameter of about 54 mm and a radial width of about 4 mm. The outer diameters and radial widths of primary alignment component 216 and secondary alignment component 218 need not be exactly equal. For instance, the radial width of secondary alignment component 218 can be slightly less than the radial width of primary alignment component 216 and/or the outer diameter of secondary alignment component 218 can also be slightly less than the radial width of primary alignment component 216 so that, when in alignment, the inner and outer sides of primary alignment component 216 extend beyond the corresponding inner and outer sides of secondary alignment component 218. Thicknesses (or axial dimensions) of primary alignment component 216 and secondary alignment component 218 can also be chosen as desired. In some embodiments, primary alignment component 216 has a thickness of about 1.5 mm while secondary alignment component 218 has a thickness of about 0.37 mm. (All numerical values herein are examples and may be varied as desired.)

Primary alignment component 216 can be formed of a number of primary magnets 226, and secondary alignment component 218 can be formed of a number of secondary magnets 228. In the example shown, the number of primary magnets 226 is equal to the number of secondary magnets 228, but this is not required. Primary magnets 226 and secondary magnets 228 can have arcuate (or curved) shapes in the transverse plane such that when primary magnets 226 (or secondary magnets 228) are positioned adjacent to one another end-to-end, primary magnets 226 (or secondary magnets 228) form an annular structure as shown. In some embodiments, primary magnets 226 can be in contact with each other at interfaces 230, and secondary magnets 228 can be in contact with each other at interfaces 232. Alternatively, small gaps or spaces may separate adjacent primary magnets 226 or secondary magnets 228, providing a greater degree of tolerance during manufacturing.

In some embodiments, primary alignment component 216 can also include an annular shield 214 (also referred to as a DC magnetic shield or DC shield) disposed on a distal surface of primary magnets 226. In some embodiments, DC shield 214 can be formed as a single annular piece of material and adhered to primary magnets 226 to secure primary magnets 226 into position. DC shield 214 can be formed of a material that has high magnetic permeability and/or high magnetic saturation value, such as stainless steel or low-carbon steel, and can redirect magnetic fields to prevent them from propagating beyond the distal side of primary alignment component 216, thereby protecting sensitive electronic components located beyond the distal side of primary alignment component 216 from magnetic interference.

Primary magnets 226 and secondary magnets 228 can be made of a magnetic material such as an NdFeB material, other rare earth magnetic materials, or other materials that can be magnetized to create a persistent magnetic field. Each secondary magnet 228 can be a dipole magnet having a single magnetic region with a magnetic polarity having a component in the radial direction in the transverse plane (as shown by magnetic polarity indicator 217 in FIG. 2B). The magnetic orientation can be in a radial direction with respect to axis 201 or another direction having a radial component in the transverse plane. Each primary magnet 226 can be a quad-pole magnet having two magnetic regions having opposite magnetic orientations. For example, each primary magnet 226 can include an inner arcuate magnetic region 252 having a magnetic orientation in a first axial direction (as shown by polarity indicator 253 in FIG. 2B), an outer arcuate magnetic region 254 having a magnetic orientation in a second axial direction opposite the first direction (as shown by polarity indicator 255 in FIG. 2B), and a central non-magnetized region 256 that does not have a magnetic orientation. Central non-magnetized region 256 can magnetically separate inner arcuate region 252 from outer arcuate region 254 by inhibiting magnetic fields from directly crossing through central region 256. Magnets having regions of opposite magnetic orientation separated by a non-magnetized region are referred to herein as having a "quad-pole" configuration.

In some embodiments, each secondary magnet 228 can be made of a magnetic material that has been ground and shaped into an arcuate structure, and a magnetic orientation having a radial component in the transverse plane can be created, e.g., using a magnetizer. Similarly, each primary magnet 226 can be made of a single piece of magnetic material that has been ground and shaped into an arcuate structure, and a magnetizer can be applied to the arcuate structure to induce an axial magnetic orientation in one direction within an inner arcuate region of the structure and an axial magnetic orientation in the opposite direction within an outer arcuate region of the structure, while demagnetizing or avoiding creation of a magnetic orientation in the central region. In some alternative embodiments, each primary magnet 226 can be a compound structure with two arcuate pieces of magnetic material providing inner arcuate magnetic region 252 and outer arcuate magnetic region 254; in such embodiments, central non-magnetized region 256 can be formed of an arcuate piece of nonmagnetic (or demagnetized) material or formed as an air gap defined by sidewalls of inner arcuate magnetic region 252 and outer arcuate magnetic region 254. DC shield 214 can be formed of a material that has high magnetic permeability and/or high magnetic saturation value, such as stainless steel or low-carbon steel, and can be plated, e.g., with 5-10 μm of matte Ni. Alternatively, DC shield 214 can be formed of a magnetic material having a radial magnetic orientation (in the opposite direction of secondary magnets 228). In some embodiments, DC shield 214 can be omitted entirely.

As shown in FIG. 2B, the magnetic polarity of secondary magnet 228 (shown by indicator 217) can be oriented such that when primary alignment component 216 and secondary alignment component 218 are aligned, the south pole of secondary magnet 228 is oriented toward the north pole of inner arcuate magnetic region 252 (shown by indicator 253) while the north pole of secondary magnet 228 is oriented toward the south pole of outer arcuate magnetic region 254 (shown by indicator 255). Accordingly, the respective magnetic orientations of inner arcuate magnetic region 252, secondary magnet 228 and outer arcuate magnetic region 256 can generate magnetic fields 240 that exert an attractive force between primary magnet 226 and secondary magnet 228, thereby facilitating alignment between respective electronic devices in which primary alignment component 216 and secondary alignment component 218 are disposed (e.g., as shown in FIG. 1). DC shield 214 can redirect some of magnetic fields 240 away from regions below primary magnet 226. Further, the "closed-loop" magnetic field 240 formed around central non-magnetized region 256 can have tight and compact field lines. Thus, magnetically sensitive components can be placed relatively close to primary alignment component 216 with reduced concern for stray magnetic fields.

While each primary magnet 226 includes two regions of opposite magnetic orientation, it should be understood that the two regions can but need not provide equal magnetic field strength. For example, outer arcuate magnetic region 254 can be more strongly polarized than inner arcuate magnetic region 252. Depending on the particular implementation of primary magnets 226, various techniques can be used to create asymmetric polarization strength. For example, inner arcuate magnetic region 252 and outer arcuate magnetic region 254 can have different radial widths; increasing radial width of a magnetic region increases the field strength of that region due to increased volume of magnetic material. Where inner arcuate magnetic region 252 and outer arcuate magnetic region 254 are discrete magnets, magnets having different magnetic strength can be used.

It will be appreciated that magnetic alignment system 200 is illustrative and that variations and modifications are possible. For instance, while primary alignment component 216 and secondary alignment component 218 are each shown as being constructed of eight arcuate magnets, other embodiments may use a different number of magnets, such as 16 magnets, 18 magnets, 32 magnets, 36 magnets, or any other number of magnets, and the number of primary magnets need not be equal to the number of secondary magnets. In other embodiments, secondary alignment component 218 can be formed of a single, monolithic annular magnet. Similarly, primary alignment component 216 can be formed of a single, monolithic annular piece of magnetic material with an appropriate magnetization pattern as described above, or primary alignment component 216 can be formed of a monolithic inner annular magnet and a monolithic outer annular magnet, with an annular air gap or region of nonmagnetic material disposed between the inner annular magnet and outer annular magnet. In some embodiments, a construction using multiple arcuate magnets may improve manufacturing because smaller arcuate magnets are less brittle than a single, monolithic annular magnet and are less prone to yield loss due to physical stresses imposed on the magnetic material during manufacturing. It should also be understood that the magnetic orientations of the various magnetic alignment components or individual magnets do not need to align exactly with the lateral and axial directions. The magnetic orientation can have any angle that provides a closed-loop path for a magnetic field through the primary and secondary alignment components.

2. Bimodal Alignment Components

Figure 3A:
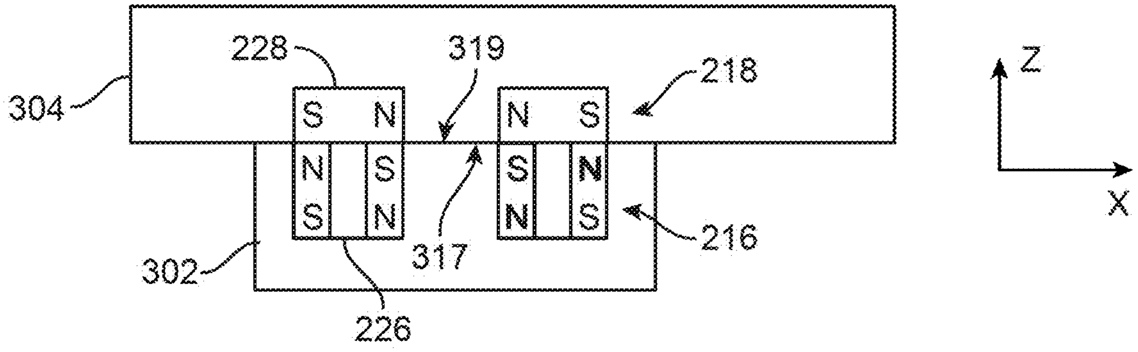
FIGS. 3A-3E show simplified cross-section views illustrating an operating principle of a bimodal alignment component according to some embodiments.

As shown in FIGS. 2A and 2B, primary alignment component 216 and secondary alignment component 218 have complementary magnetic orientations. (As used herein, the term "magnetic orientation" refers to the direction of orientation of the magnetic polarity of a magnet or magnetized region, and magnetic orientations of two magnets are said to be "complementary" if the magnetic orientations are such that the two magnets experience attractive magnetic force when in proximity to each other.) FIG. 3A shows a simplified cross-section view of a first electronic device 302 and a second electronic device 304 aligned using magnetic alignment system 200 of FIGS. 2A and 2B. Electronic devices 302 and 304 can be any two electronic devices for which magnetic alignment is desired. For example, second electronic device 304 can be a portable electronic device such as a smart phone, and first electronic device 302 can be a wireless charging device that can provide inductive power transfer to second electronic device 304.

In this example, first electronic device 302 includes primary alignment component 216 of magnetic alignment system 200 as described above. (For this reason, first electronic device 302 is also referred to as a "primary-type" electronic device.) Primary alignment component 216 can be disposed adjacent to an attachment surface 317 (e.g., inside a housing that defines attachment surface 317). Second electronic device 304 includes secondary alignment component 218 of magnetic alignment system 200 as described above. (For this reason, second electronic device 304 is referred to as a "secondary-type" electronic device.) Secondary alignment component 218 can be disposed adjacent to an attachment surface 319 (e.g., inside a housing that defines attachment surface 319). Magnetic polarities of quad-pole magnets 226 of primary alignment component 216 and magnetic polarity of dipole magnets 228 of secondary alignment component 218 are indicated using "N" (north) and "S" (south)labels. As shown in FIG. 3A, the magnetic orientation of quad-pole magnets 226 and the magnetic orientation of dipole magnets 228 are complementary (or mutually attractive), so that primary-type electronic device 302 and secondary-type electronic device 304 can be magnetically attached at respective attachment surfaces 317, 319 due to magnetic forces exerted between primary alignment component 216 and secondary alignment component 218. Thus, for example, an inductive charging coil (not shown) of primary-type electronic device 302 and an inductive charging coil (not shown) of secondary-type electronic device 304 can be aligned for efficient inductive power transfer. It should be noted that two devices with primary alignment components 216 will magnetically repel each other, and similarly, two devices with secondary alignment components 218 will also magnetically repel each other. However, in some instances, it may be desirable to have a device that can attach to either a primary-type device 302 or a secondary-type device 304.

According to some embodiments of the invention, a magnetic alignment system can also include a third type of magnetic alignment component, referred to herein as a "bimodal" alignment component. A bimodal magnetic alignment component can include an annular arrangement of magnets that are capable of reorienting (e.g., reversing) their magnetic orientation between a first orientation that is attractive to a primary alignment component (e.g., primary alignment component 216) and a second orientation that is attractive to a secondary alignment component (e.g., secondary alignment component 218). An electronic device that includes a bimodal magnetic alignment component is sometimes referred to herein as a "bimodal" electronic device (or just "bimodal device").

Figure 3B:
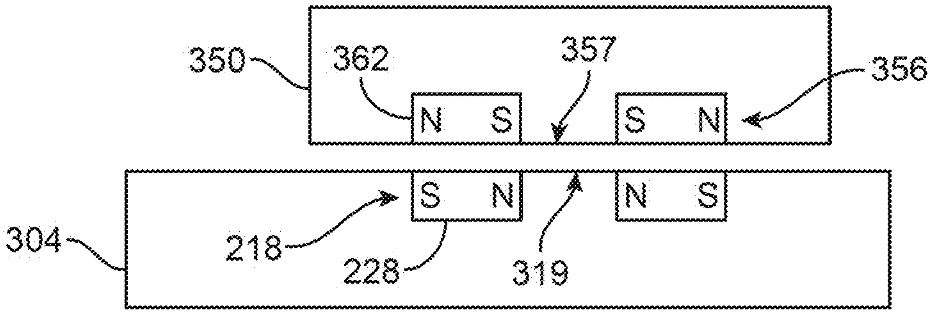
Figure 3C:
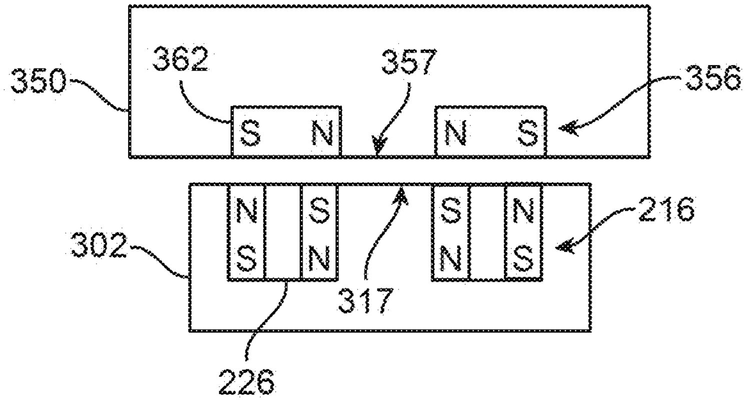

FIGS. 3B and 3C show simplified cross-section views showing an operating principle of a bimodal device 350 according to some embodiments. Bimodal device 350, as shown in FIGS. 3B and 3C, includes a bimodal magnetic alignment component 356. Bimodal magnetic alignment component 356 can include a number of individual magnets 362 arranged to define an annular shape (or ring) having approximately the same dimensions (in particular, inner and outer radius) as primary alignment component 216 or secondary alignment component 218. Each magnet 362 can be movable between two attachment positions that present different (e.g., opposite) magnetic orientations at attachment surface 357. FIG. 3B shows bimodal device 350 with magnets 362 of bimodal alignment component 356 in a first attachment position, supporting attachment to secondary-type electronic device 304, which includes secondary alignment component 218. In the first attachment position, magnets 362 are oriented such that the magnetic orientation of magnets 362 is complementary to the (fixed) magnetic orientation of magnets 228 of secondary alignment component 218, thereby allowing secondary-type electronic device 304 to attach to bimodal device 350. FIG. 3C shows bimodal device 350 with magnets 362 of bimodal alignment component 356 in a second attachment position, supporting attachment to primary-type electronic device 302, which includes primary alignment component 216. In the second attachment position, magnets 362 are reoriented such that the magnetic orientation of magnets 362 is complementary to the (fixed) magnetic orientation of magnets 226 of primary alignment component 216, supporting attachment to primary-type electronic device 302 that includes primary alignment component 216. Comparing FIGS. 3B and 3C, it can be seen that the magnetic orientation of magnets 362 (in particular, the magnetic orientation presented at attachment surface 357) is reversed between the first and second attachment positions.

Figure 3D:
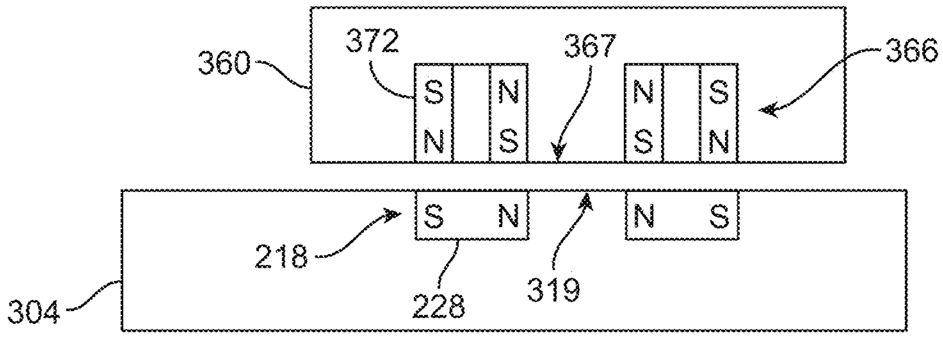
Figure 3E:
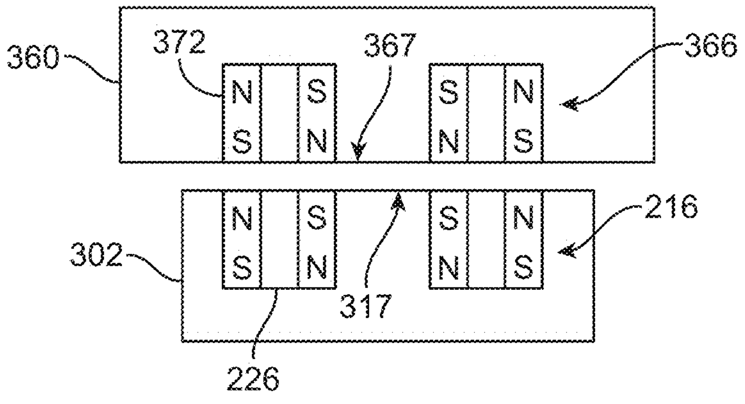

In FIGS. 3B and 3C, bimodal alignment component 356 is shown as having dipole magnets 362 with magnetic orientation in the transverse plane. In some embodiments, a bimodal alignment component can include quad-pole magnets. FIGS. 3D and 3E show simplified cross-section views showing an operating principle of a bimodal device 360 having a quad-pole magnetic configuration according to some embodiments. Bimodal device 360 includes a bimodal magnetic alignment component 366. Similarly to bimodal alignment component 356, bimodal magnetic alignment component 366 can include a number of individual magnets 372 arranged to define an annular shape (or ring) having approximately the same dimensions as primary alignment component 216 or secondary alignment component 218. Each magnet 372 can have a quad-pole configuration and can be movable between two attachment positions that present different magnetic orientations at attachment surface 367. FIG. 3D shows bimodal device 360 with magnets 372 of bimodal alignment component 356 in a first attachment position, supporting attachment to secondary-type electronic device 304, which includes secondary alignment component 218. In the first attachment position, magnets 372 are oriented such that the magnetic orientation of magnets 372 is complementary to the magnetic orientation of magnets 228 of secondary alignment component 228, thereby allowing secondary-type electronic device 304 to attach to bimodal device 360. FIG. 3E shows bimodal device 360 with magnets 372 of bimodal alignment component 366 in a second attachment position, supporting attachment to primary-type electronic device 302, which includes primary alignment component 216. In the second attachment position, magnets 372 are reoriented such that the magnetic orientation of magnets 372 is complementary to the magnetic orientation of magnets 226 of primary alignment component 216, thereby allowing primary-type electronic device 302 to attach to bimodal device 360. Comparing FIGS. 3D and 3E, it can be seen that the magnetic orientation of magnets 372 (in particular, the magnetic orientation presented at attachment surface 367) is reversed between the first and second attachment positions.

As described below, in some embodiments the reversal of magnetic orientation can be achieved by rotating or displacing magnets 362 in bimodal alignment component 356 (or magnets 372 in bimodal alignment component 366). For instance, each magnet of a bimodal alignment component can be freely and separately rotatable about a desired axis or freely and separately displaceable in a desired direction, and rotation or displacement into one attachment position or the other can occur naturally as an effect of magnetic forces when a device having either a primary or secondary alignment component is brought into proximity with bimodal device 350 (or bimodal device 360). Accordingly, in some embodiments, no user action is required to attach bimodal device 350 (or bimodal device 360) to either a primary-type or secondary-type electronic device, other than bringing devices into proximity. In some embodiments, a bimodal alignment component can also include at least one magnet that is not reorientable, and the fixed (non-reorientable) magnet can provide a bias force toward one or the other of the attachment positions; examples are described below.

In various embodiments, a bimodal electronic device can be any electronic device that has a bimodal alignment component. For example, a bimodal device can be a battery pack for a portable electronic device such as a smart phone. Using a bimodal alignment component (e.g., bimodal alignment component 356 or 366 described above), the battery pack can attach to a primary-type electronic device (e.g., a wireless charging puck or other wireless charger device) to charge its internal battery. At other times, the battery pack can attach to a secondary-type electronic device (e.g., a smart phone) to provide power from its internal battery to the secondary-type electronic device. The bimodal battery pack device can use the same inductive coil and bimodal alignment component for both charging its battery (receiving power) and supplying (transmitting) power, which can reduce the size and weight of the device as compared to having separate coils for transmitting and receiving power.

As another example, a bimodal device can be a power-consuming accessory device (such as a wearable device) that is used with a portable electronic device such as a smart phone. The smart phone can be a secondary-type electronic device that is capable of receiving power wirelessly (e.g., from a charging puck or other wireless charger that can be a primary-type electronic device) and is also capable transmitting power wirelessly to enable on-the-go recharging of an accessory device. In some embodiments, the smart phone can transmit and receive power at different times using the same inductive coil. A bimodal accessory device can attach to and receive power from either the smart phone (secondary-type electronic device) or from a wireless charger (primary-type electronic device) using the same bimodal alignment component and inductive coil. As these examples illustrate, a bimodal device can provide flexibility in attaching to different types of electronic devices, without requiring the bimodal device to have two separate magnetic alignment components.

3. Reorientable Magnets for Bimodal Alignment Component

According to some embodiments of the invention, a bimodal alignment component (e.g., bimodal alignment component 356 or bimodal alignment component 366) includes an array of independently movable magnets (e.g., magnets 362 or magnets 372 in FIGS. 3B-3E) arranged in an annular configuration (or ring). The ring can have dimensions (e.g., inner and outer radii) equal or approximately equal to the inner and outer radii of to the primary and secondary alignment components of a given magnetic alignment system. Individual magnets in the bimodal alignment component can move between a first attachment position in which the magnetic polarity is oriented in a first direction and a second attachment position in which the magnetic polarity is oriented in a second direction (e.g., opposite the first direction). In the first attachment position, the magnetic orientation is attractive to a primary alignment component (and repulsive to a secondary alignment component), and in the second attachment position, the magnetic orientation is attractive to a secondary alignment component (and repulsive to a primary alignment component). In some embodiments, the magnets are mounted so as to provide at least one degree of freedom of motion (which can be either rotational or translational motion), and movement of the magnets into either the first or second attachment position can be driven by the magnetic force exerted by a primary or secondary alignment component being brought into proximity to the bimodal alignment component. Specific examples of magnets and arrangements of magnets that can be used to implement a bimodal alignment component will now be described.

3.1. Axial Rotation

Figure 4:
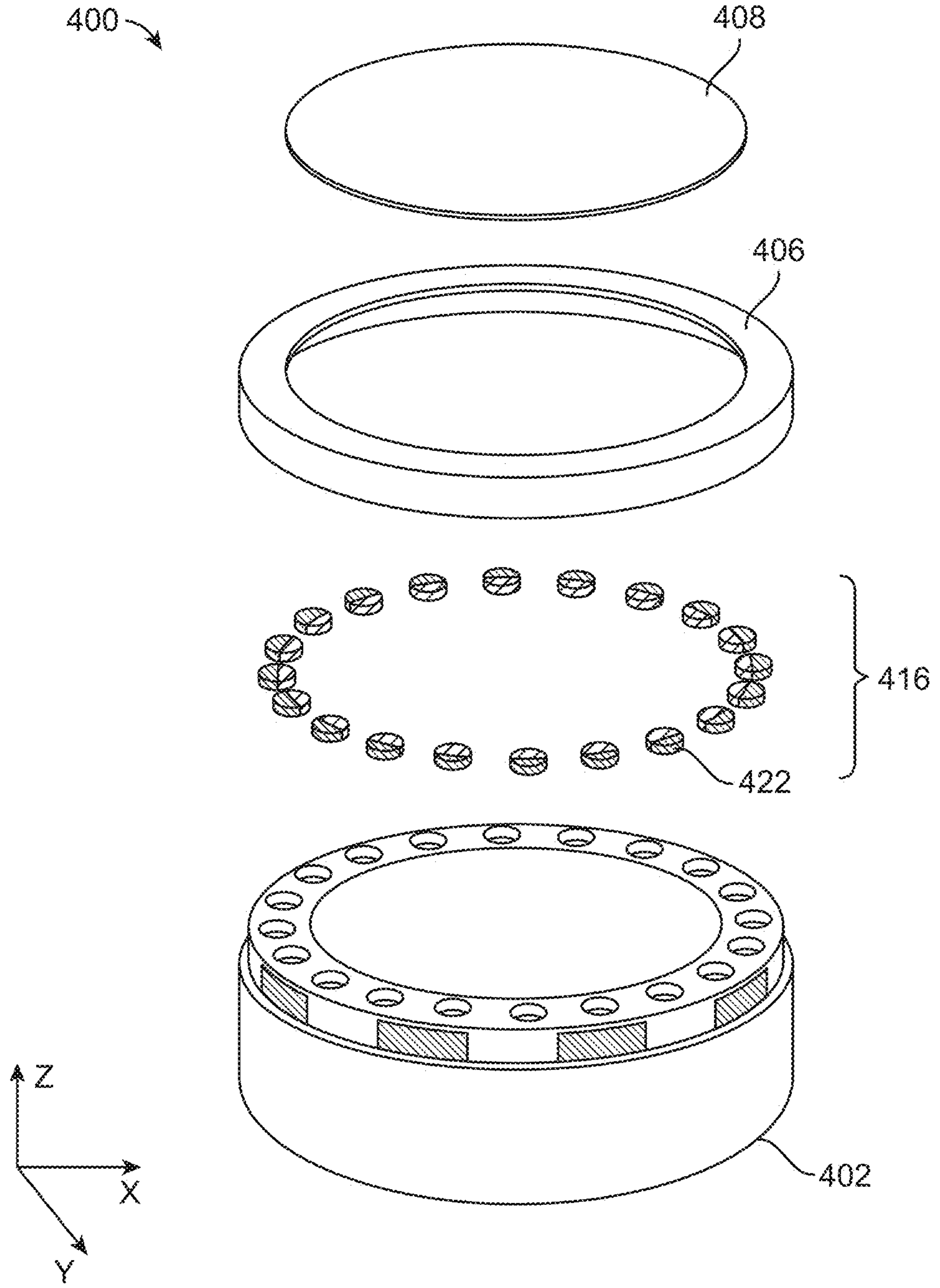
FIG. 4 shows a simplified exploded view of a bimodal device according to some embodiments.

In some embodiments, each magnet of a bimodal alignment component moves between the first and second attachment positions by freely rotating about an axis parallel to the axis of the ring defined by the magnet array. FIG. 4 shows a simplified exploded view of a bimodal device 400 according to some embodiments. Bimodal device 400 includes a housing 402, which can house active electronic components of bimodal device 400 (including, e.g., an inductive charging coil and supporting circuitry). The particular size and shape of housing 402, as well as the particular components housed therein, can be varied as desired.

Bimodal device 400 includes a bimodal alignment component 416, which can be an implementation of bimodal alignment component 366 described above. In this example, bimodal alignment component 416 includes a number (e.g., 20) of disc-shaped (or cylindrical) magnets 422 arranged in a ring (or annulus). Housing 402 can include cylindrical recesses 432, also arranged in a ring. Each magnet 422 can be held in one of cylindrical recess 432, and each cylindrical recess 432 can be sized and shaped such that magnet 422 is free to rotate about its center axis (parallel to the z axis) within recess 432, while lateral movement of magnet 422 in any direction is restricted (e.g., by the sidewalls of recess 432). A protective cover including an annular cover portion 406 and a central cover portion 408 can be provided over the top of bimodal alignment component 416. Annular cover portion 406 can be made of a material that has high magnetic permeability for DC magnetic fields. Central cover portion 408 can be made of other materials, e.g., a material having high magnetic permeability for AC magnetic fields that may be transmitted or received through central cover portion 408.

Figure 5A:
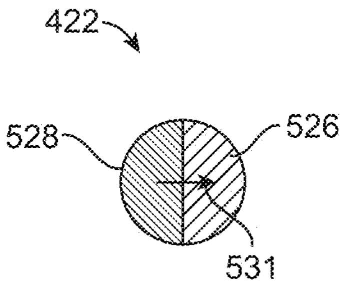
FIGS. 5A and 5B show an axial view and a side view of a magnet that can be used in a bimodal alignment component according to some embodiments.
Figure 5B:
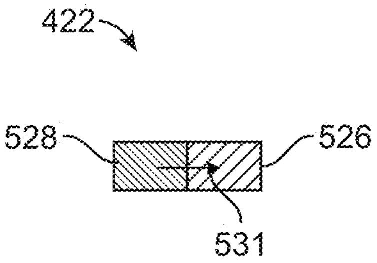

FIGS. 5A and 5B show an axial (z-direction in FIG. 4) view and a side (xy plane) view of one of magnets 422 according to some embodiments. As shown, magnet 422 can have a dipole configuration with approximately half the disc (or cylinder) having magnetic north polarization 526 and approximately half the disc (or cylinder) having magnetic south polarization 528. (Arrow 531 indicates magnetic orientation; contrasting shading is also used in the drawings to indicate magnetic north and south.) Thus magnet 422 can be a dipole magnet with magnetic orientation in the transverse direction, e.g., parallel to a diameter of magnet 422. Magnets 422 can be fabricated using materials and techniques described above with reference to FIGS. 2A and 2B, and the desired magnetic configuration can be imparted, e.g., using a magnetizer.

Figure 6A:
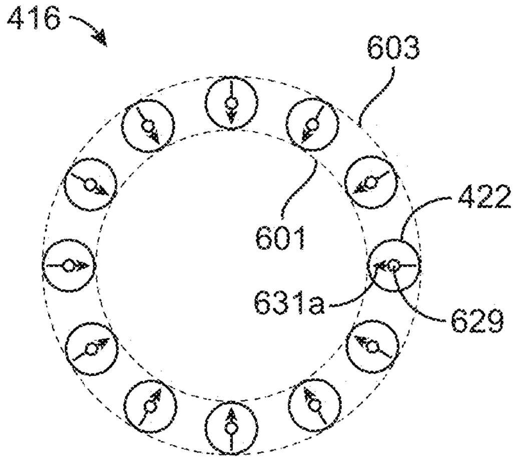
FIGS. 6A and 6B show simplified top views of a bimodal alignment component in two different positions according to some embodiments.
Figure 6B:
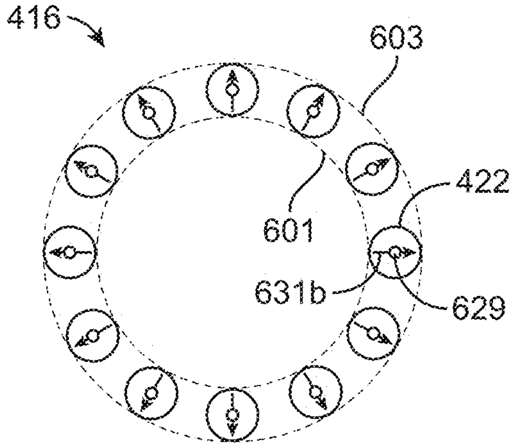

FIGS. 6A and 6B show simplified top views of bimodal alignment component 416 in two different positions according to some embodiments. In bimodal alignment component 416, magnets 422 are arranged in a ring that defines an annular structure having an inner edge 601 and an outer edge 603. The radial width and inner/outer radius of the annular structure thus defined can correspond to the radial width and inner/outer radius of a primary or secondary alignment component in a particular magnetic alignment system. FIG. 6A shows bimodal alignment component 416 in a first attachment position, which can be a position that is attractive to primary alignment component 216. As shown, each magnet 422 is rotated about its center axis 629 such that the magnetic north pole is oriented inward (as indicated by arrow 631*a*). FIG. 6B shows bimodal alignment component 416 in a second attachment positon, which can be a position that is attractive to secondary alignment component 218. As shown, each magnet 422 is rotated about its center axis 629 such that the magnetic north pole is oriented inward (as indicated by arrow 631*b*).

Figure 7:
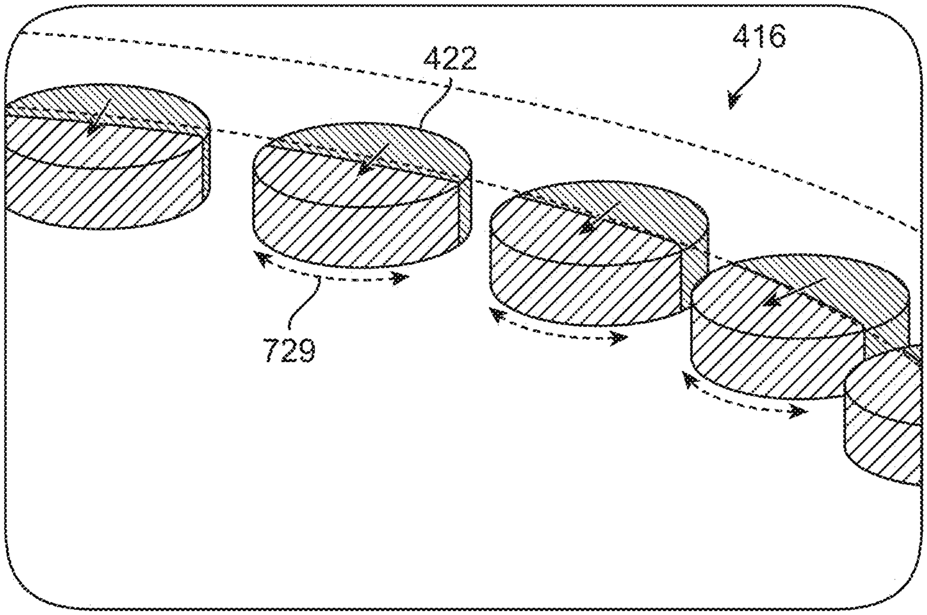
FIG. 7 shows a partial perspective view of a bimodal alignment component according to some embodiments.

Further illustrating the rotational degree of freedom, FIG. 7 shows a partial perspective view of bimodal alignment component 416 according to some embodiments. The rotational degree of freedom of each magnet 422 that allows movement between the first and second attachment positions is indicated by arrows 729. In some embodiments, rotation into either attachment position can occur due to the magnetic forces exerted when an alignment component having a fixed magnetic orientation (either a primary or secondary alignment component) is brought into proximity with bimodal alignment component 416. As the components are brought into proximity, the magnets 422 of bimodal alignment component 416 can rotate into a complementary alignment, exerting an attractive force that aligns and attaches the fixed-orientation (primary or secondary) alignment component.

It will be appreciated that bimodal alignment component 416 is illustrative and that variations and modifications are possible. For example, the number, diameter, thickness, and spacing of magnets 422 can be varied. (As used herein, a "disc" can be understood as a cylinder whose length is shorter than its diameter, and magnets 422 can but need not have this geometric property.) In some embodiments, the diameter of each magnet 422 is chosen to match (exactly or approximately) the radial width of the secondary alignment component or the primary alignment component. Magnets 422 can be spaced evenly around the ring as shown in FIGS. 4, 6A, and 6B. In some embodiments, increasing the number of magnets 422 in a ring of a given size can increase the amount of magnetic material and (in principle) the attractive force exerted by bimodal alignment component 416. It should be noted, however, that as the space between magnets 422 is reduced, magnets 422 may exert forces on each other that may deter rotation into an attachment position. Accordingly, it may be desirable to limit the number of magnets 422. In various embodiments, the number of magnets can be 12, 20, 30, or some other number.

In bimodal alignment component 416, a rotational degree of freedom can be provided by placing each magnet 422 in a cylindrical recess (e.g., as shown in FIG. 4). Other techniques can also be used to allow free rotation while restricting movement in other directions. For example, each magnet 422 can be mounted on an axle or spindle held in place at one or both ends to permit axial rotation.

Figure 8A:
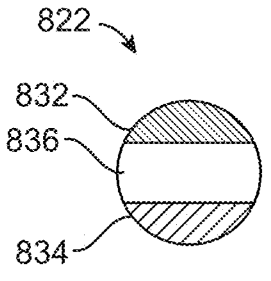
FIGS. 8A and 8B show an axial view and a side view of a magnet that can be used in a bimodal alignment component according to some embodiments.
Figure 8B:
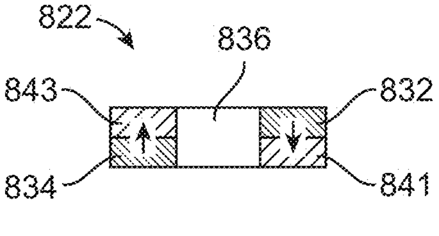

In the example described above, each magnet 422 has a dipole configuration oriented in the lateral (or transverse) plane. In other embodiments, quad-pole magnets can be used. By way of example, FIGS. 8A and 8B show an axial (z-direction in FIG. 4) view and a side (xy plane) view of a magnet 822 that can be used in a bimodal alignment component (similar to bimodal alignment component 416) according to some embodiments. As shown, magnet 822 can have a quad-pole configuration with a central non-magnetized region 836 extending between a pair of parallel chords in the axial view shown in FIG. 8A, a first side region 832 having a magnetic polarity oriented in a first axial direction (as indicated by arrow 841 in FIG. 8B) and a second side region 834 having a magnetic polarity oriented in a second axial direction opposite the first axial direction (as indicated by arrow 843 in FIG. 8A). Magnets 822 can be fabricated using techniques and materials described above with reference to FIGS. 2A and 2B, and the desired magnetic configuration can be imparted, e.g., using a magnetizer. In some embodiments, magnets 822 can be used in place of magnets 422 in bimodal alignment component 416 described above to provide similar magnetic attachment behavior.

In some embodiments, the magnetic forces exerted by a primary alignment component 216 and a by secondary alignment component 218 may be unequal in magnitude. For example, primary alignment component 216 may include larger magnets that can exert a stronger magnetic force (at given distance) as compared to secondary alignment component 218. It may be desirable to provide a more balanced force profile for bimodal alignment component 416 such that the attraction force profile between bimodal alignment component 416 and primary alignment component 216 is similar to that between bimodal alignment component 416 and secondary alignment component 218. In some embodiments, the force profile can be balanced by modifying bimodal alignment component 416 in a manner that introduces asymmetry between the two attachment positions. For example, one or two or more (e.g., fewer than half) of magnets 422 can be non-rotatable and fixed in a magnetic orientation that attracts secondary alignment component 218 (or whichever fixed-orientation alignment component is weaker). The fixed magnet(s) 422 will repel primary alignment component 216; however, the repulsion can be overcome by the movable (rotatable) magnets 422, and a net attractive force of similar magnitude to that of secondary alignment component 216 can be produced. As another example, where quad-pole magnets 822 are used, the relative sizes of the oppositely polarized side regions can be modified to introduce a desired asymmetry.

3.2. Radial Rotation

Figure 9:
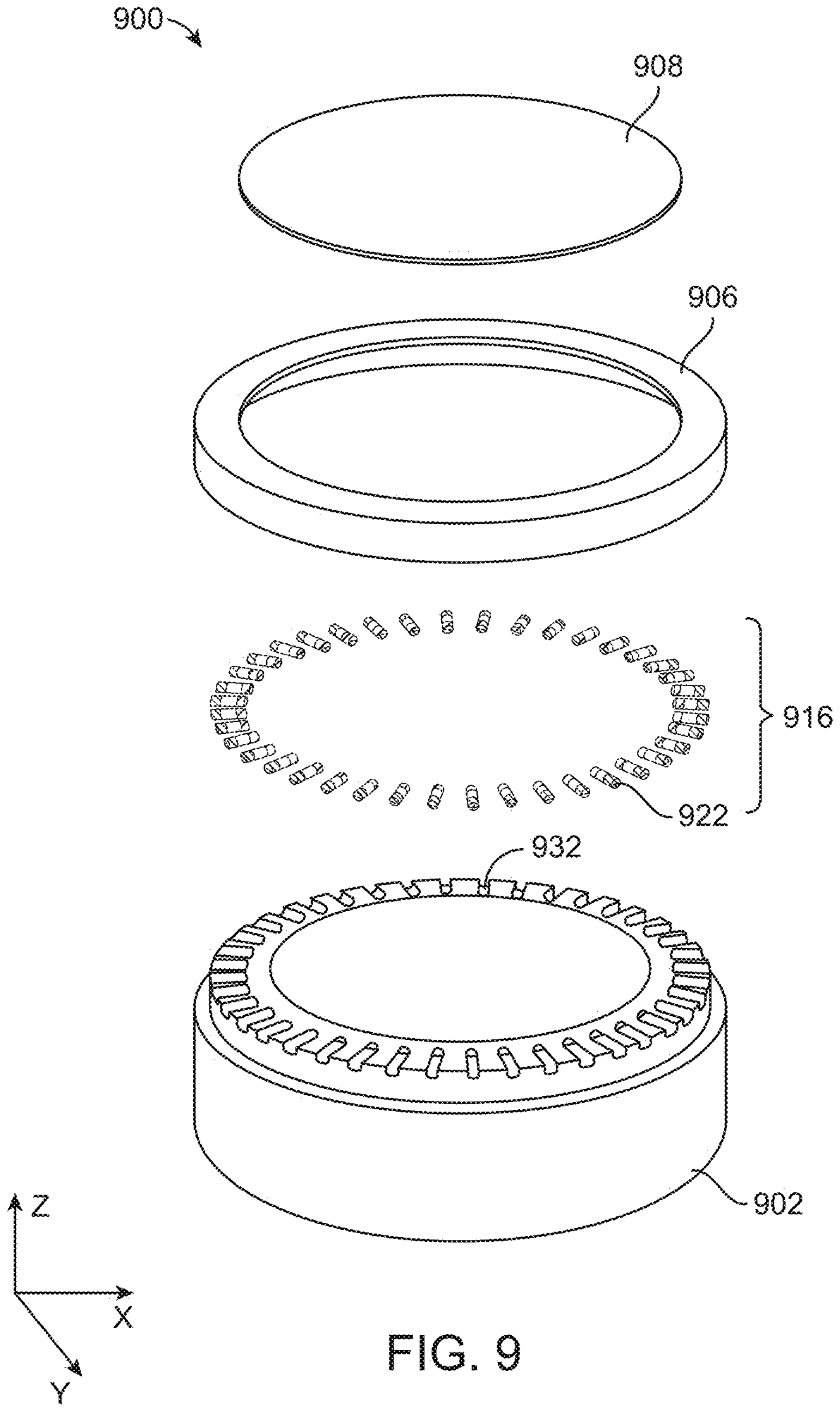
FIG. 9 shows a simplified exploded view of a bimodal device according to some embodiments.

In some embodiments, each magnet of a bimodal alignment component moves by rotating about an axis aligned with a radius of the ring defined by the magnet array. FIG. 9 shows a simplified exploded view of a bimodal device 900 according to some embodiments. Bimodal device 900 includes a housing 902, which can house active electronic components of bimodal device 900 (including, e.g., an inductive charging coil and supporting circuitry). The particular size and shape of housing 902, as well as the particular components housed therein, can be varied as desired.

Bimodal device 900 includes a bimodal alignment component 916, which can be an implementation of bimodal alignment component 376 described above. In this example, bimodal alignment component 916 includes a number (e.g., 40) of cylindrical magnets 922 arranged in a ring. Housing 902 can include half-cylindrical recesses 932 arranged in a ring. Each magnet 922 can be held in one of cylindrical recess 932, and each cylindrical recess 932 can be sized and shaped such that cylindrical magnet 922 is free to rotate about its axis (which is oriented radially to the ring) while lateral movement of magnet 922 in any direction is restricted. In some embodiments, each cylindrical recess 932 can be lined with a magnetic-flux directing material (which can be similar to materials used for DC shield 214 described above). A protective cover including an annular cover portion 906 and a central cover portion 908 can be provided over the top of bimodal alignment component 916. Annular cover portion 906 can be made of a material that has high magnetic permeability for DC magnetic fields. Central cover portion 908 can be made of other materials, e.g., a material having high magnetic permeability for AC magnetic fields that may be transmitted or received through central cover portion 908.

Figure 10A:
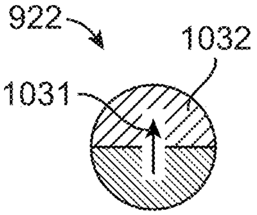
FIGS. 10A-10C show a side view and opposing end views of a cylindrical magnet that can be used in a bimodal alignment component according to some embodiments.
Figure 10B:
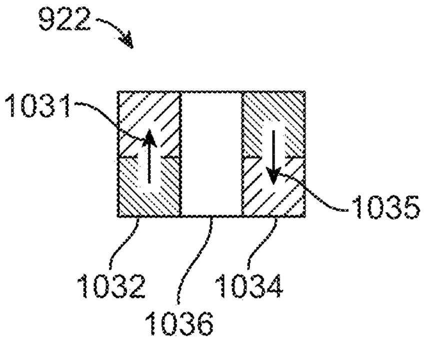
Figure 10C:
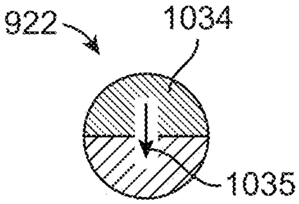

FIGS. 10A-10C show a side view and opposing end views of one of cylindrical magnets 922 according to some embodiments. As shown, magnet 922 can be a quad-pole magnet. For instance, region 1032 at one end of magnet 922 can have magnetic polarity oriented in a first direction parallel to an end surface of magnet 922, as indicated by arrow 1031 and shading patterns. Region 1034 at the other end of magnet 922 can have magnetic polarity oriented in a second direction opposite the first direction, as indicated by arrow 1035 and shading patterns. Center region 1036 can be a non-magnetized region. Magnets 922 can be fabricated using materials and techniques described above with reference to FIGS. 2A and 2B, and the desired magnetic configuration can be imparted, e.g., using a magnetizer.

Figure 11A:
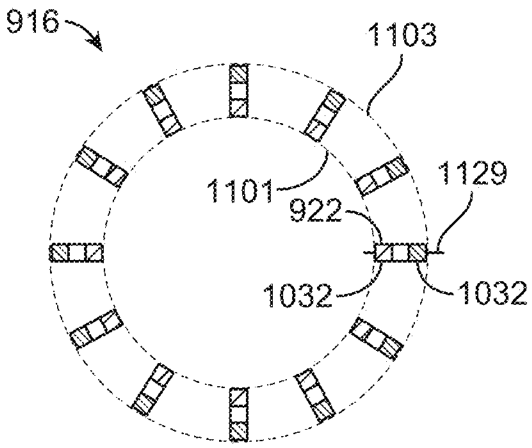
FIGS. 11A and 11B show simplified top views of a bimodal alignment component in two different attachment positions according to some embodiments.
Figure 11B:
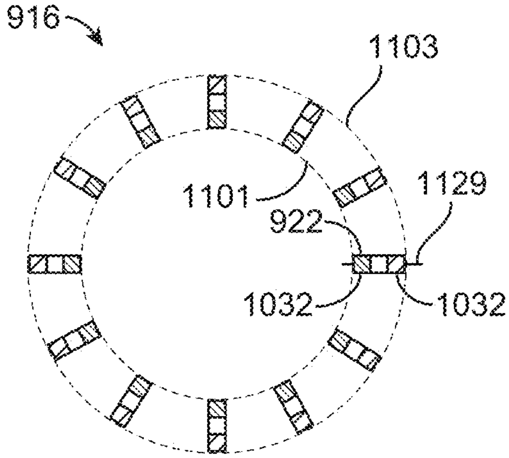

FIGS. 11A and 11B show simplified top views of bimodal alignment component 916 in two different attachment positions according to some embodiments. In bimodal alignment component 916, magnets 922 are arranged in a ring that defines an annular structure having an inner edge 1101 and an outer edge 1103. The radial width and inner/outer radius of the annular structure thus defined can correspond to the radial width and inner/outer radius of a primary or secondary alignment component in a particular magnetic alignment system. FIG. 11A shows bimodal alignment component 916 in a first attachment position, which can be a position that is attractive to primary alignment component 216. As shown, each magnet 922 is rotated about its axis 1129 (which is oriented radially) such that region 1032 has its magnetic north pole oriented upward from the plane of the drawing and region 1034 has its magnetic south pole oriented upward from the plane of the drawing, as indicated by the shading patterns. FIG. 11B shows bimodal alignment component 916 in a second attachment positon, which can be a position that is attractive to secondary alignment component 218. As shown, each magnet 922 is rotated about its axis 1129 such that region 1032 has its magnetic south pole oriented upward from the plane of the drawing and region 1034 has its magnetic north pole oriented upward from the plane of the drawing, as indicated by the shading pattern. The rotation can be a 180-degree rotation about axis 1129.

Figure 12:
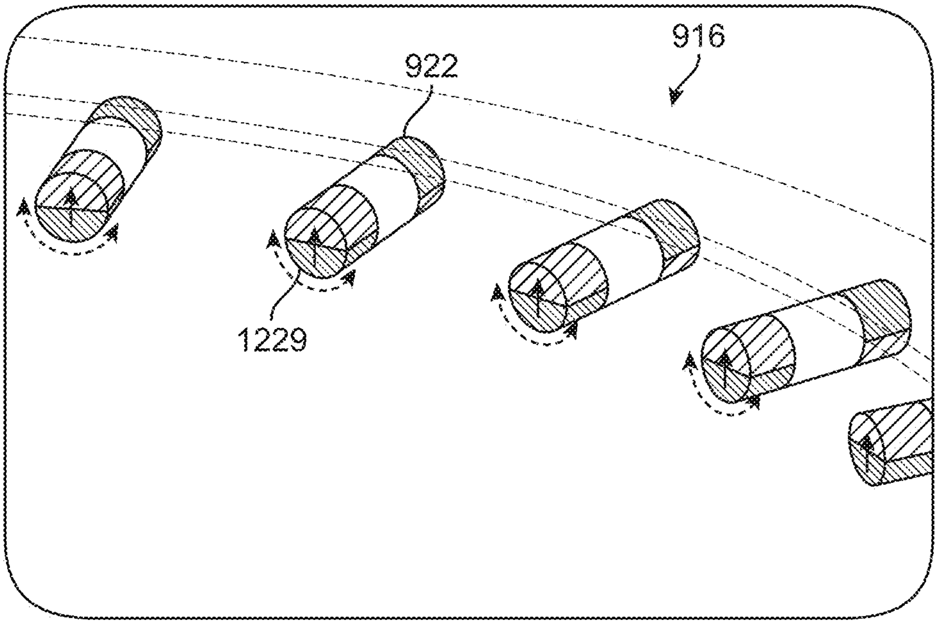
FIG. 12 shows a partial perspective view of a bimodal alignment component according to some embodiments.

Further illustrating the rotational degree of freedom, FIG. 12 shows a partial perspective view of bimodal alignment component 916 according to some embodiments. The rotational degree of freedom of each magnet 922 that allows movement between the positions shown in FIGS. 11A and 11B is indicated by arrows 1229. In some embodiments, rotation into either attachment position can occur due to the magnetic forces exerted when an alignment component having a fixed magnetic orientation (either a primary or secondary alignment component) is brought into proximity with bimodal alignment component 916. As the components are brought into proximity, the magnets 922 of bimodal alignment component 916 can rotate into a complementary alignment, exerting an attractive force that aligns and attaches the fixed-orientation (primary or secondary) alignment component.

It will be appreciated that bimodal alignment component 916 is illustrative and that variations and modifications are possible. For example, the number, diameter, length, and spacing of the magnets can be varied. In some embodiments, the length of each cylindrical-magnet 922 is chosen to match (exactly or approximately) the radial width of the secondary alignment component or the primary alignment component. The diameter of the cylindrical magnet 922 can be chosen based on an amount of magnetic material desired. Magnets 922 can be spaced evenly in a ring as shown in FIGS. 9, 11A, and 11B. In some embodiments, increasing the number of magnets (for a ring of a given size) can increase the amount of magnetic material and (in principle) the attractive force exerted by bimodal alignment component 916. It should be noted, however, that as the space between magnets 922 is reduced, magnets 922 may exert forces on each other that may deter rotation into an attachment position. Accordingly, it may be desirable to limit the number of magnets 922. In various embodiments, the number of magnets can be 12, 20, 40, 60, or some other number.

In bimodal alignment component 916, a rotational degree of freedom can be provided by placing each magnet 922 in a half-cylindrical recess (e.g., as shown in FIG. 9). Other techniques can also be used. For example, each magnet 922 can be mounted on an axle or spindle held in place at one or both ends to permit axial rotation while restricting other movement.

In some embodiments, the magnetic forces exerted by a primary alignment component 216 and a by secondary alignment component 218 may be unequal in magnitude, as described above, and it may be desirable to provide a more balanced force profile for bimodal alignment component 916. In some embodiments, the force profile can be balanced by modifying bimodal alignment component 916 in a manner that introduces asymmetry between the two attachment positions. For example, one or two or more (e.g., fewer than half) of magnets 922 can be non-rotatable and fixed in a rotational orientation that attracts secondary alignment component 218 (or whichever fixed-orientation alignment component is weaker). The fixed magnet(s) 922 will repel primary alignment component 216; however, the repulsion can be overcome by the other magnets, and a net attractive force of similar magnitude to that of secondary alignment component 216 can be produced. As another example, the relative sizes of the two oppositely-polarized end regions of quad-pole magnets 922 can be modified to introduce a desired asymmetry.

3.3. Tangential Rotation

In some embodiments, each magnet of a bimodal alignment component moves by rotating about an axis tangential to the annular ring defined by the magnet array. For example, the magnets can be cylindrical magnets with axes oriented tangentially to the annular ring.

Figure 13A:
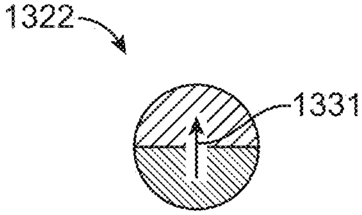
FIGS. 13A and 13B show an axial view and an end view of a magnet that can be used in a bimodal alignment component according to some embodiments.
Figure 13B:
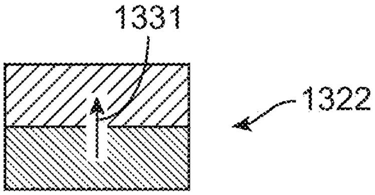

FIGS. 13A and 13B show an axial view and an end view of a cylindrical magnet 1322 that can be used in a bimodal alignment component according to some embodiments. As shown, magnet 1322 can be a dipole magnet having a magnetic orientation parallel to an end surface of magnet 1322, as indicated by arrow 1331 and shading patterns. Magnets 1322 can be fabricated as described above with reference to FIGS. 2A and 2B, and the desired magnetic configuration can be imparted, e.g., using a magnetizer.

Figure 14A:
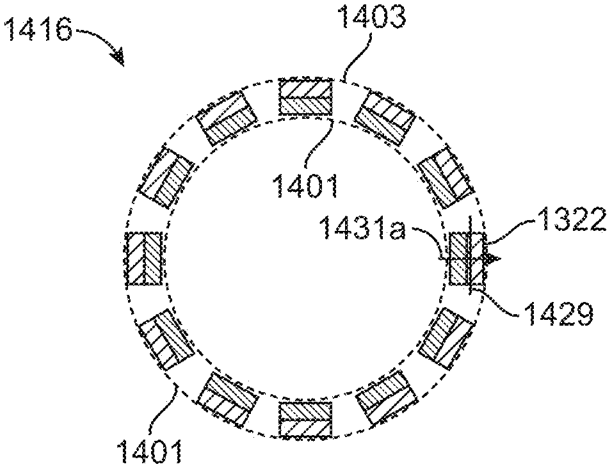
FIGS. 14A and 14B show simplified top views of a bimodal alignment component in two different attachment positions according to some embodiments.
Figure 14B:
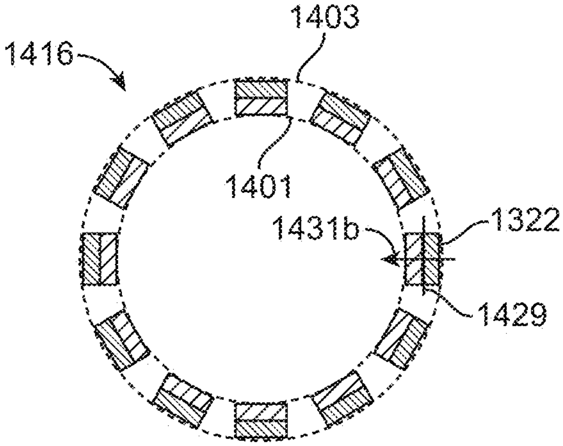

FIGS. 14A and 14B show simplified top views of a bimodal alignment component 1416 incorporating magnets 1322 in two different attachment positions according to some embodiments. In bimodal alignment component 1416, magnets 1422 are arranged in a ring that defines an annular structure having an inner edge 1401 and an outer edge 1403. The radial width and inner/outer radius of the annular structure thus defined can correspond to the radial width and inner/outer radius of a primary or secondary alignment component in a particular magnetic alignment system. FIG. 14A shows bimodal alignment component 1416 in a first attachment position, which can be a position that is attractive to primary alignment component 216. As shown, each magnet 1322 is rotated about its axis 1429 (which is oriented tangentially to ring edges 1401, 1403) such that the magnetic north poles are oriented radially outward and magnetic south poles are oriented radially inward, as indicated by arrow 1431*a* and shading patterns. FIG. 14B shows bimodal alignment component 1416 in a second attachment positon, which can be a position that is attractive to secondary alignment component 218. As shown, each magnet 1322 is rotated about its axis 1429 such that the magnetic north poles are oriented radially inward and magnetic south poles are oriented radially outward, as indicated by arrow 1431*b* and shading patterns.

Bimodal alignment component 1416 can be incorporated into a bimodal device in a manner similar to that shown in FIGS. 4 and 9. For example, the bimodal device can have a housing and a number of half-cylindrical recesses to hold magnets 1322 such that axial rotation is permitted while lateral movement in any direction is restricted. The recesses can be similar to recesses 932 in FIG. 9 but oriented tangentially (as shown in FIGS. 14A and 14B), rather than radially (as shown in FIG. 9). In some embodiments, a rotational degree of freedom can be provided by mounting each magnet 1322 on an axle or spindle held in place at the ends and permitting axial rotation.

It will be appreciated that bimodal alignment component 1416 is illustrative and that variations and modifications are possible. For example, the number, diameter, length, and spacing of magnets 1322 can be varied. In some embodiments, the diameter of each cylindrical magnet 1322 is chosen to match (exactly or approximately) the radial width of the secondary alignment component or the primary alignment component. The length of the cylindrical magnet 1322 can be chosen based on an amount of magnetic material desired. Magnets 1322 can be spaced evenly in a ring as shown in FIGS. 14A and 14B. In some embodiments, increasing the number of magnets can increase the amount of magnetic material and (in principle) the attractive force exerted by bimodal alignment component 1416. In various embodiments, the number of magnets can be 12, 20, 30, 40, 60, or some other number.

Similar to embodiments described above, it may be desirable to balance the force profile for bimodal alignment component 1416 to account for a difference in magnetic strength between primary alignment component 216 and secondary alignment component 218. For example, one or more (but fewer than half) of magnets 1322 can be non-rotatable and fixed in an orientation that attracts secondary alignment component 218 (or whichever fixed-orientation alignment component is weaker). The fixed magnet(s) 1322 will repel primary alignment component 216; however, the repulsion can be overcome by the other magnets, and a net attractive force of similar magnitude to that of secondary alignment component 216 can be produced.

3.4. Radial Translation

Figure 15A:
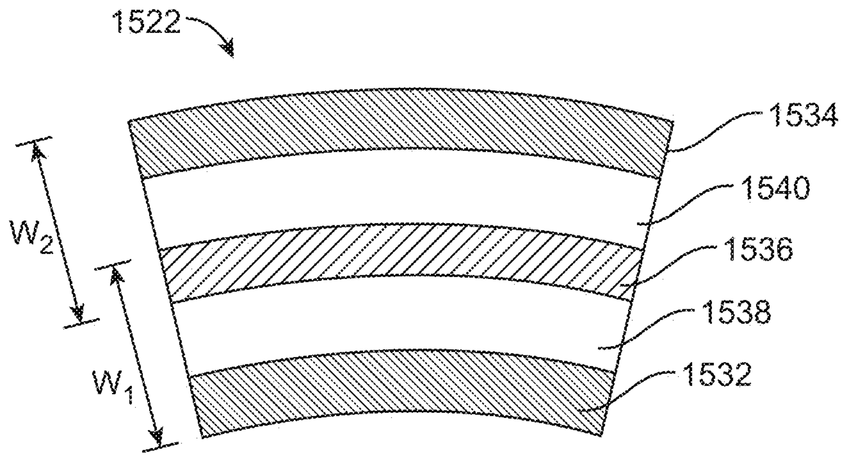
FIGS. 15A and 15B show an axial view and an end view of an arcuate magnet that can be used in a bimodal alignment component according to some embodiments.
Figure 15B:
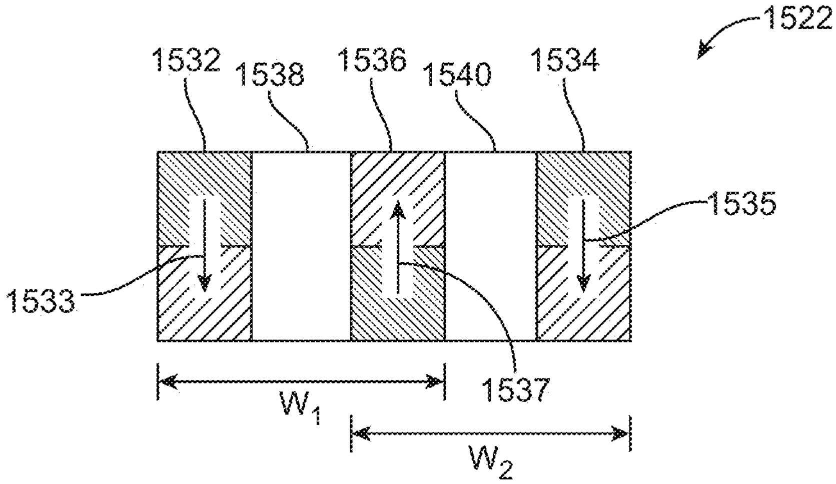

In some embodiments, the magnets in a bimodal alignment component can use a translational degree of freedom rather than a rotational degree of freedom to provide bimodal magnetic attachment. For instance, the magnets can be arcuate magnets (e.g., similar to magnets 226 of primary alignment component 216) that can shift position in a radially inward or radially outward direction. FIGS. 15A and 15B show an axial view and an end view of an arcuate magnet 1522 that can be used in a bimodal alignment component according to some embodiments. Arcuate magnet 1522 has a “triple-pole” configuration. An inner arcuate region 1532 and an outer arcuate region 1534 each have magnetic polarity oriented in a first axial direction, as indicated by arrows 1533 and 1535 in FIG. 15B and shading patterns. A central arcuate region 1536 has magnetic polarity oriented in a second axial direction, as indicated by arrow 1537 and shading patterns. A first arcuate non-magnetized region 1538 separates magnetized regions 1532 and 1536, and a second arcuate non-magnetized region 1540 separates magnetized regions 1534 and 1536. The radial widths of regions 1532, 1534, 1536, 1538, and 1540 can be chosen such that a radial width $w_1$ from the inner edge of inner arcuate region 1532 to the outer edge of central arcuate region 1536 is approximately equal to a radial width of secondary alignment component 218 and such that a radial width $w_2$ from the inner edge of central arcuate region 1536 to the outer edge of outer arcuate region 1534 is approximately equal to a radial width of primary alignment component 216.

Figure 16A:
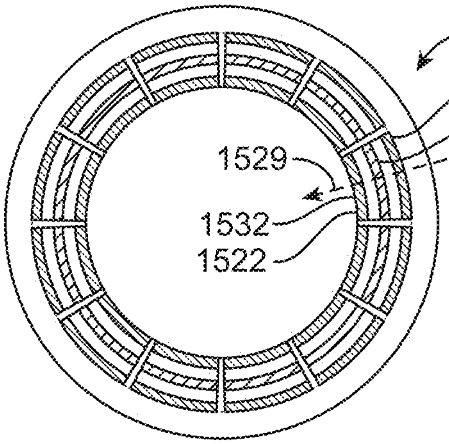
FIGS. 16A-16D show top and side views of a bimodal alignment component in two different attachment positions, according to some embodiments.
Figure 16B:
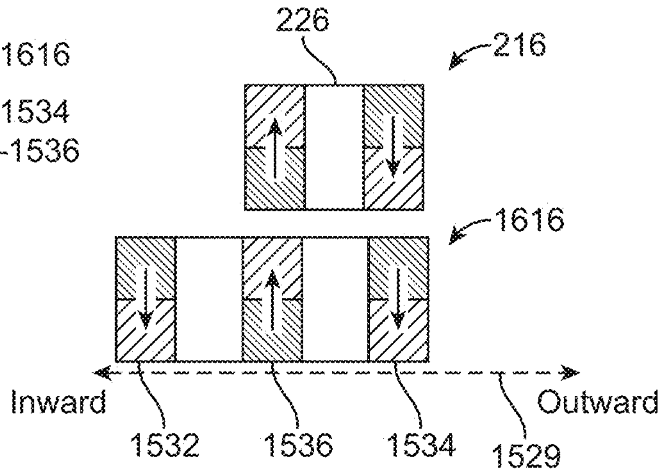
Figure 16C:
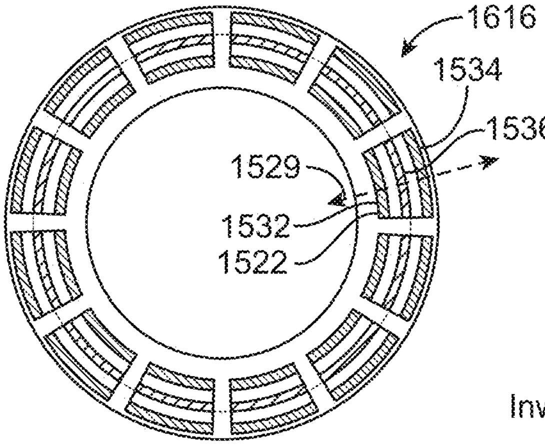
Figure 16D:
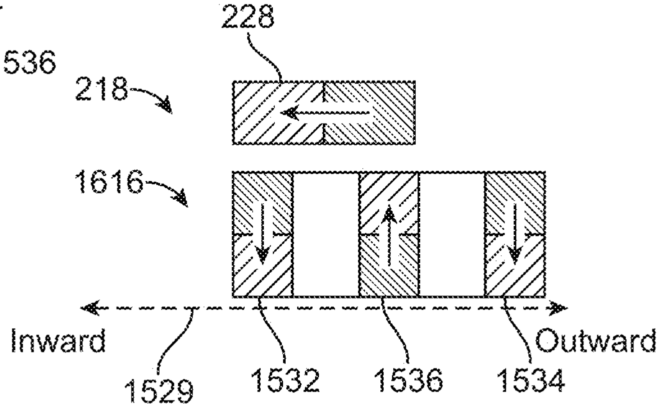

FIGS. 16A-16D show top and side views of a bimodal alignment component 1616 incorporating triple-pole arcuate magnets 1522, in two different attachment positions, according to some embodiments. FIG. 16A shows a top view of bimodal alignment component 161 in a first attachment position, which can be a position that is attractive to primary alignment component 216, and FIG. 16B shows a corresponding side cross-section view. As shown, each magnet 1522 is in an inward position along a radial line 1629. In this position, as best seen in FIG. 16B, outer arcuate region 1534 and central arcuate region 1536 can provide attraction and alignment for a quad-pole magnet 226 of primary alignment component 216, while inner arcuate region 1532 is displaced inward and provides little or no magnetic force on magnet 226. Similarly, FIG. 16C shows a top view of bimodal alignment component 1616 in a second attachment position, which can be a position that is attractive to secondary alignment component 218, and FIG. 16D shows a corresponding side cross-section view. As shown, each magnet 1522 is in an outward position along radial line 1629. In this position, as best seen in FIG. 16D, inner arcuate region 1532 and central arcuate region 1536 can provide attraction and alignment for a dipole magnet 228 of secondary alignment component 218, while outer arcuate region 1534 is displaced outward and provides little or no magnetic force on magnet 228. The mapping of inward and outward positions to primary and secondary alignment components is arbitrary and can be reversed. For instance, the polarities of triple-pole magnet 1522 can be arranged such that the inward position of FIGS. 16A and 16B provides attraction to a secondary alignment component while the outward position of FIGS. 16C and 16D provides attraction to a primary alignment component.

Figure 17:
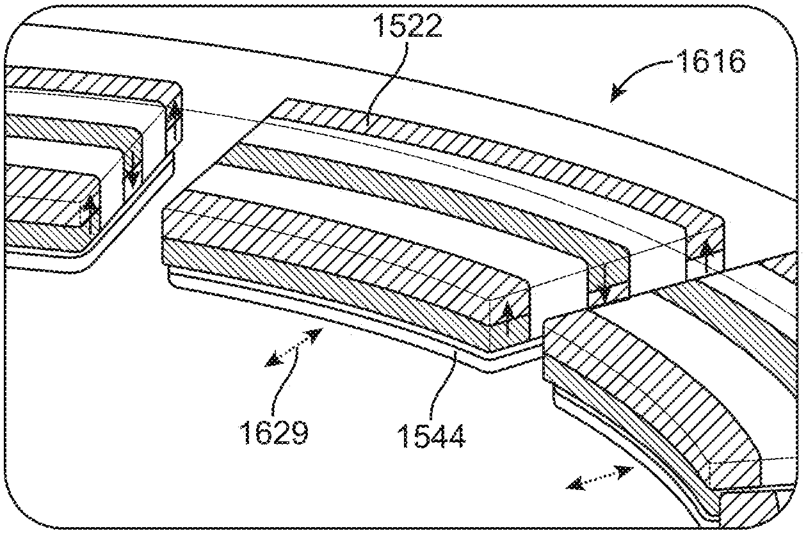
FIG. 17 shows a partial perspective view of a bimodal alignment component according to some embodiments.

Further illustrating the radial-translation degree of freedom, FIG. 17 shows a partial perspective view of bimodal alignment component 1616 according to some embodiments. The radial-translation degree of freedom that allows movement between the positions shown in FIGS. 16A and 16C is indicated by arrow 1629. In some embodiments, translation into either attachment position can occur due to the magnetic forces exerted when an alignment component having a fixed magnetic orientation (either a primary or secondary alignment component) is brought into proximity with bimodal alignment component 1616. As the components are brought into proximity, the magnets 1522 of bimodal alignment component 1616 can shift (inward or outward) into a complementary alignment, exerting an attractive force that aligns and attaches the fixed-orientation (primary or secondary) alignment component.

Bimodal alignment component 1616 can be incorporated into a bimodal device in a manner similar to bimodal alignment components described above. For example, the bimodal device can have a housing and a number of arcuate recesses to hold magnets 1522 such that radial translation is permitted while other lateral movement and any rotational movement is restricted. In some embodiments, magnets 1522 can be biased toward one attachment position or the other. For instance, as described above, the magnetic force exerted by secondary alignment component 216 (at a given distance) can be smaller than the magnetic force exerted by primary alignment component 218, and it may be desirable to bias magnets 1522 toward the attachment position for secondary alignment component 216. For example, a spring, cantilever, or other compressible member can be used to apply a biasing force; examples are described below.

Figure 18:
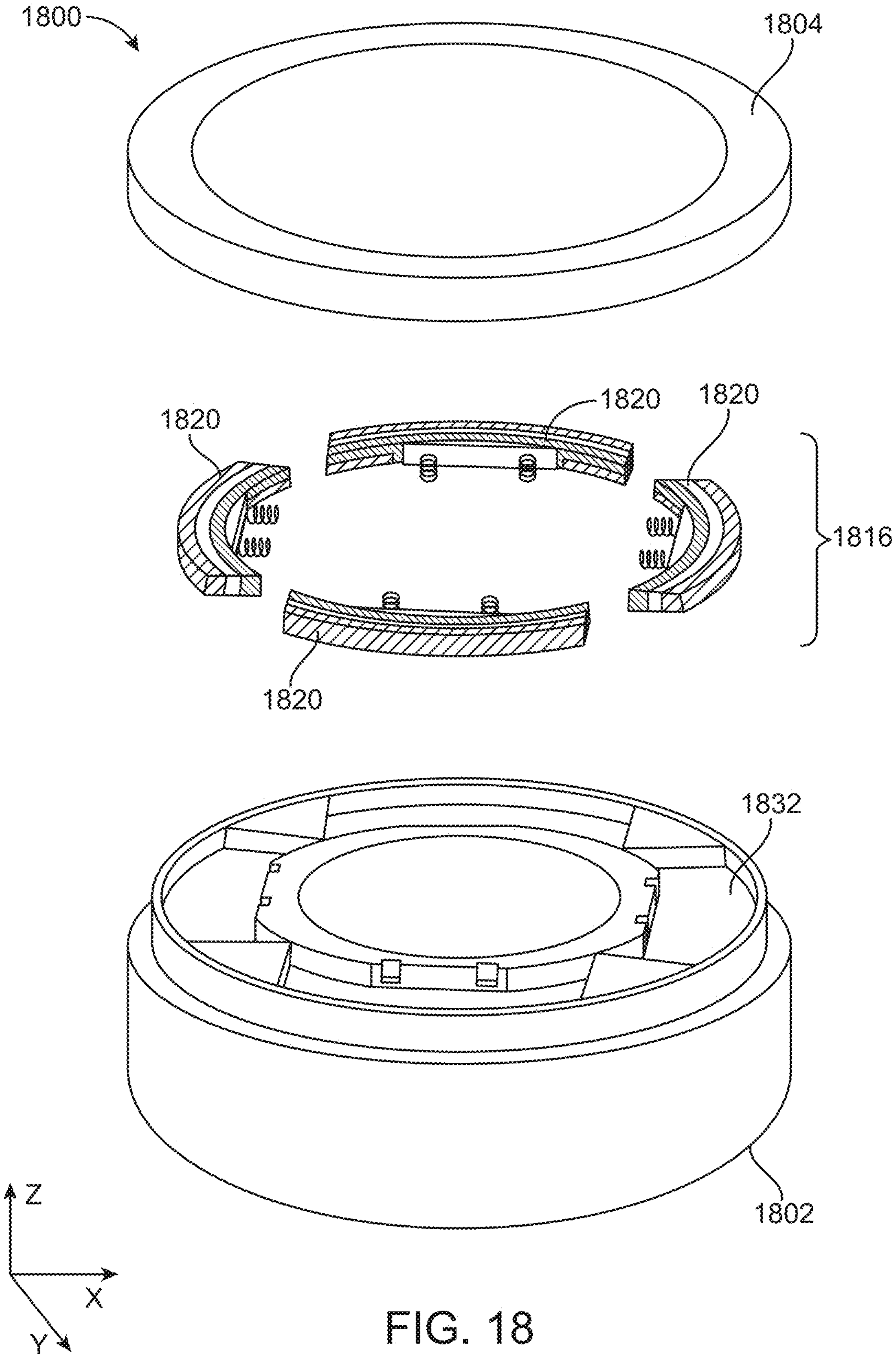
FIG. 18 shows a simplified exploded view of a bimodal device according to some embodiments.

FIG. 18 shows a simplified exploded view of a bimodal device 1800 according to some embodiments. Like other bimodal devices described above, bimodal device 1800 includes a housing 1802, which can house active electronic components of bimodal device 1800 (including, e.g., an inductive charging coil and supporting circuitry). The particular size and shape of housing 1802, as well as the particular components housed therein, can be varied as desired.

Bimodal device 1800 can include a bimodal alignment component 1816, which can be similar to bimodal alignment component 1616 described above. In this example, bimodal alignment component 1818 includes a number (e.g., 4) of arcuate magnet assemblies 1820 arranged in an annular configuration. Housing 1802 can include a recess 1832 to receive and hold each arcuate magnet assembly 1820, and each recess 1832 can be sized and shaped such that arcuate magnet assembly 1820 is free to move laterally in a radially inward or outward direction while other lateral movement (and any rotational movement) is restricted. A protective cover 1804 can be provided over the top of bimodal alignment component 1816. The portion of cover 1804 that overlies annular alignment component 1816 can be made of a material that has high magnetic permeability for DC magnetic fields; other portions of cover 1804 can be made of the same material or different materials (similarly to embodiments described above).

Figure 19:
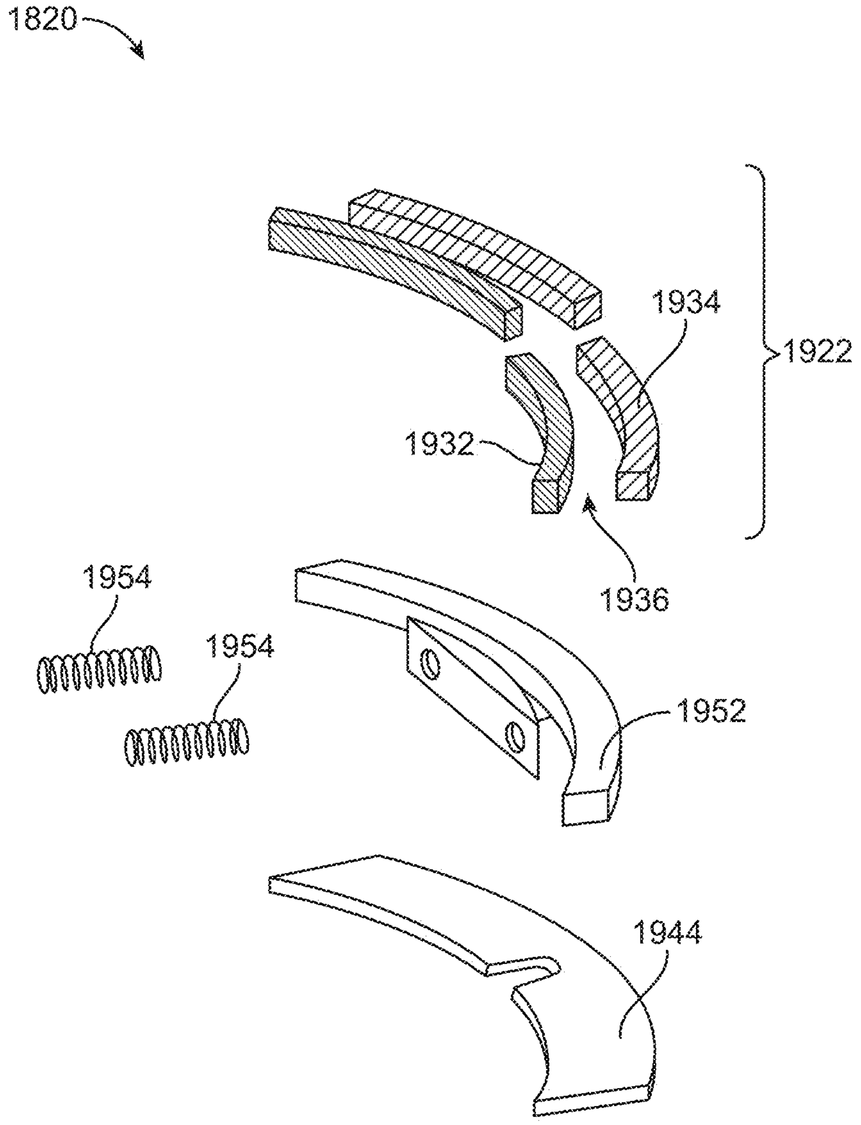
FIG. 19 shows a simplified exploded view of a magnet assembly that can be used in a bimodal alignment component according to some embodiments.

FIG. 19 shows a simplified exploded view of one of magnet assemblies 1820 according to some embodiments. Magnet assembly 1820 includes an arcuate magnet 1922, which can be similar to arcuate magnet 1522 described above. In this example, magnet 1922 has a quad-pole configuration with an inner arcuate region 1932 having magnetic polarity oriented in a first axial direction and an outer arcuate region 1934 having magnetic polarity oriented in a second axial direction opposite the first direction. A non-magnetized arcuate region 1936 can separate inner arcuate region 1932 and outer arcuate region 1934. A magnet spacer 1952 (which can be made of plastic or other non-magnetic material) can be disposed abutting the inboard surface of magnet 1922. Bias springs 1954 can be coil springs having one end abutting or connected to magnet spacer 1952 and the other end abutting or connected to the inboard wall of recess 1932 (as best seen in FIG. 18). In some embodiments, another compressible member, such as a cantilever, a beehive spring, a compressible foam or mesh, or other deformable structure capable of exerting a biasing force in the desired direction (e.g., radially outward), can be substituted for bias springs 1954. A DC shield 1944, which can be similar to DC shield 214 of FIG. 2B, can be disposed on a distal surface of magnet assembly 1820. It should be understood that in some embodiments triple-pole magnets 1522 can be used in place of quad-pole magnets 1922.

Figure 20A:
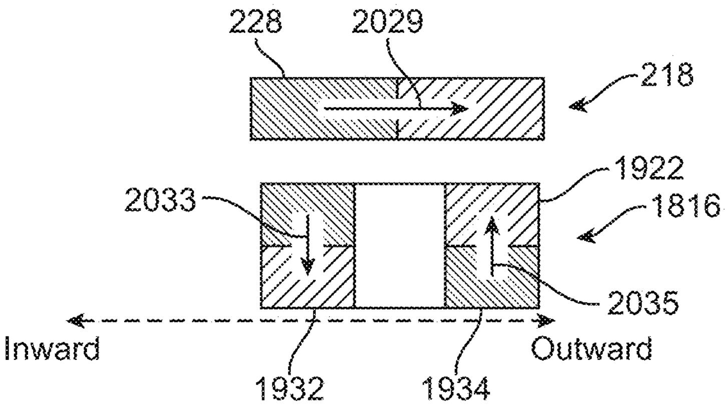
FIGS. 20A and 20B show simplified cross-section views illustrating attachment positions for a bimodal alignment component according to some embodiments.
Figure 20B:
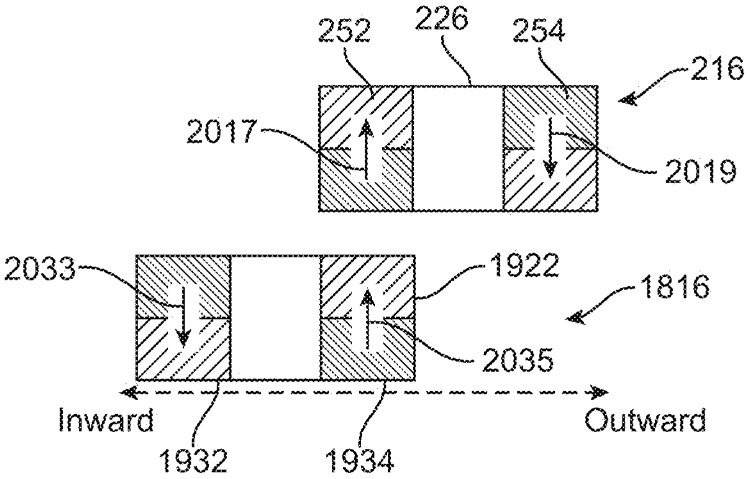

As noted, magnet assembly 1820 can use either triple-pole magnets (e.g., magnets 1522 described above) or quad-pole magnets 1922. Where triple-pole magnets are used, operation of bimodal alignment component 1816 can be similar or identical to that of bimodal alignment component 1616 described above. Where quad-pole magnets 1922 are used, magnetized regions 1932 and 1936 can be sized and shaped such that, in one attachment position, quad-pole magnet 1922 aligns both inner and outer magnetized regions to the fixed-orientation alignment component and, in the other attachment position, quad-pole magnet 1922 aligns only the outer (or only the inner) magnetized region to the fixed-orientation alignment component. FIGS. 20A and 20B show simplified cross-section views illustrating attachment positions for quad-pole magnet 1922 according to some embodiments. As shown in FIG. 20A, when a secondary alignment component 218 having a magnet 228 with a dipole orientation as shown by arrow 2029 is brought into alignment with bimodal alignment component 1816, magnets 1922 are shifted to their radially-outward positions. As indicated by arrows 2033, 2035 and shading patterns, the magnetic orientations of inner arcuate region 1932 and outer arcuate region 1934 align with complementary ends of dipole magnet 228, providing an attractive magnetic force that can support attachment and/or alignment. As shown in FIG. 20B, when a primary alignment component 216 having a quad-pole magnet 226 with magnetic orientation as indicated by arrows 2017, 2019 and shading patterns is brought into alignment with bimodal alignment component 1816, magnets 1922 are shifted to their radially-inward positions. As indicated by arrow 2035 and shading patterns, the magnetic orientation of outer arcuate region 1934 of quad-pole magnet 1922 aligns with the complementary magnetic orientation of inner arcuate region 252 of quad-pole magnet 226, forming a magnetic dipole-dipole attraction that can support attachment and/or alignment. Inner arcuate region 1932 of quad-pole magnet 1922 and outer arcuate region 254 of quad-pole magnet 226 are spaced apart from the interface region and contribute little or no magnetic force.

In the example of FIGS. 19, 20A and 20B, it is assumed that secondary alignment component 218 exerts a weaker magnetic force (at a given distance) than primary alignment component 216 on magnets 1922. Accordingly, magnets 1922 are biased by springs 1954 into the attachment position for secondary alignment component 218, and primary alignment component 216 can exert sufficient force to overcome the spring bias and draw magnets 1922 toward the center of the ring, into the attachment positon shown in FIG. 20B. The same principle can be applied if triple-pole magnets 1522 are used instead of quad-pole magnets 1922. In some embodiments, presenting a quad-pole interface to secondary alignment-component 218 and a dipole interface to primary alignment component 216 (as is the case for quad-pole magnets 1922) can provide additional force-balancing but may be less robust against lateral misalignment.

It will be appreciated that bimodal alignment components 1616 and 1816 are illustrative and that variations and modifications are possible. For example, the number, dimensions, and spacing of the arcuate magnets can be varied. The radial widths of the arcuate magnetized regions in a triple-pole or quad-pole configuration can be selected to match (exactly or approximately) the radial width of the secondary alignment component or the primary alignment component. Magnets 1522 or 1922 can be spaced evenly in a ring as shown in FIGS. 16A and 16C. In various embodiments, the number of magnets can be 4, 8, 12, 16, or some other number. Spacing between magnets can be varied as desired and (as shown, for instance, in FIG. 18), angular gaps can be present between magnets.

As noted above, in some embodiments the magnetic forces exerted by a primary alignment component 216 and a by secondary alignment component 218 may be unequal in magnitude. To provide a balanced force profile, the size (e.g., radial width) of each magnetized region in magnets 1522 or 1922 can be controlled to provide optimum attraction to primary and secondary alignment components. For example, in configurations described above where the primary alignment component 216 exerts the stronger magnetic force, outer arcuate region 1534 of magnets 1522 (or outer arcuate region 1934 of magnets 1922) can be made wider than inner accurate region 1532 (or inner arcuate region 1932). Varying the size of magnetized regions can be used in addition to or instead of biasing forces as described above.

3.5. Vertical Displacement

Figure 21:
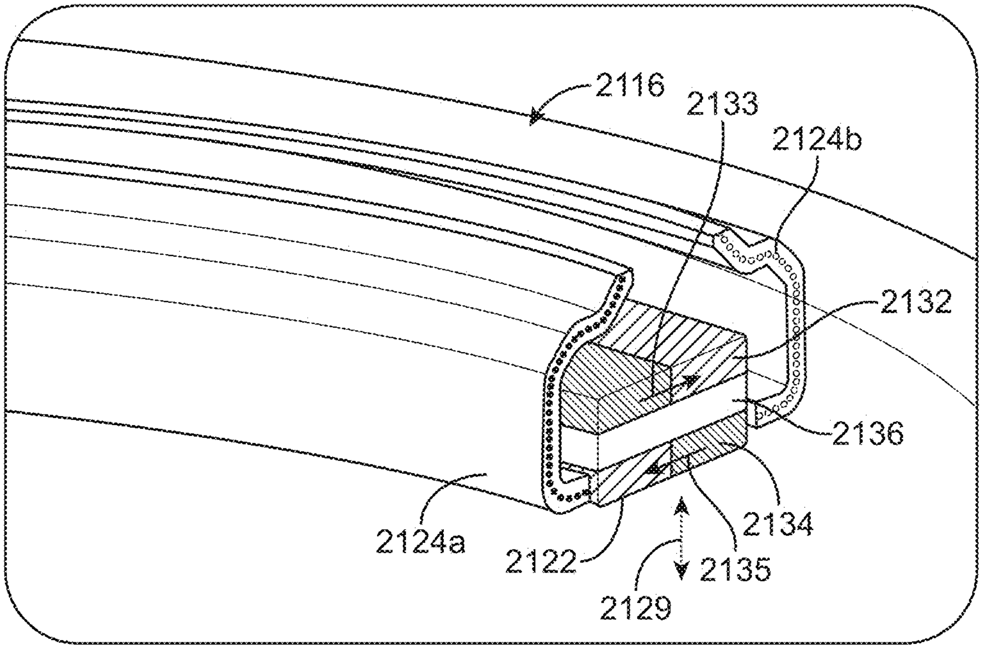
FIG. 21 shows a partial perspective view of a bimodal alignment component according to some embodiments.

In some embodiments, a bimodal alignment component can move axially to change the direction of magnetic flux in a surrounding member made of soft magnetic material. FIG. 21 shows a partial perspective view of a bimodal alignment component 2116 according to some embodiments. Bimodal alignment component 2116 can have an annular shape (only a portion of which is shown). Bimodal alignment component can include an annular magnetic element 2122 (which can be constructed of arcuate sections, similar to primary alignment component 216 and secondary alignment component 218 described above) disposed between an inner flux guide 2124*a* and an outer flux guide 2124*b*. Annular magnetic element 2122 can have a quad-pole configuration oriented in the lateral plane. For instance, a proximal arcuate region 2132 can have magnetic polarity oriented in a radially outward direction as indicated by arrow 2133 and shading patterns, and a distal arcuate region 2134 can have magnetic polarity oriented in a radially inward direction as indicated by arrow 2135 and shading patterns. An arcuate non-magnetized region 2136 can separate proximal annular region 2132 and distal annular region 2134. Magnetic element 2122 can be fabricated using materials and techniques described above with reference to FIGS. 2A and 2B, and the desired magnetic configuration can be imparted, e.g., using a magnetizer. Flux guides 2124*a*, 2124*b* can be made of a soft magnetic material that has high DC magnetic permeability, and flux guides 2124*a*, 2124*b* can be shaped to direct magnetic flux produced by magnetic element 2122 along a desired low-reluctance path through flux guides 2124*a*, 2124*b*. Annular magnetic element 2122 can be displaced in the axial direction relative to flux guides 2124*a*, 2124*b*, as indicated by arrow 2129, and the direction of flux through flux guides 2124*a*, 2124*b* can be reversed by appropriate displacement of annular magnetic element 2122.

Figure 22B:
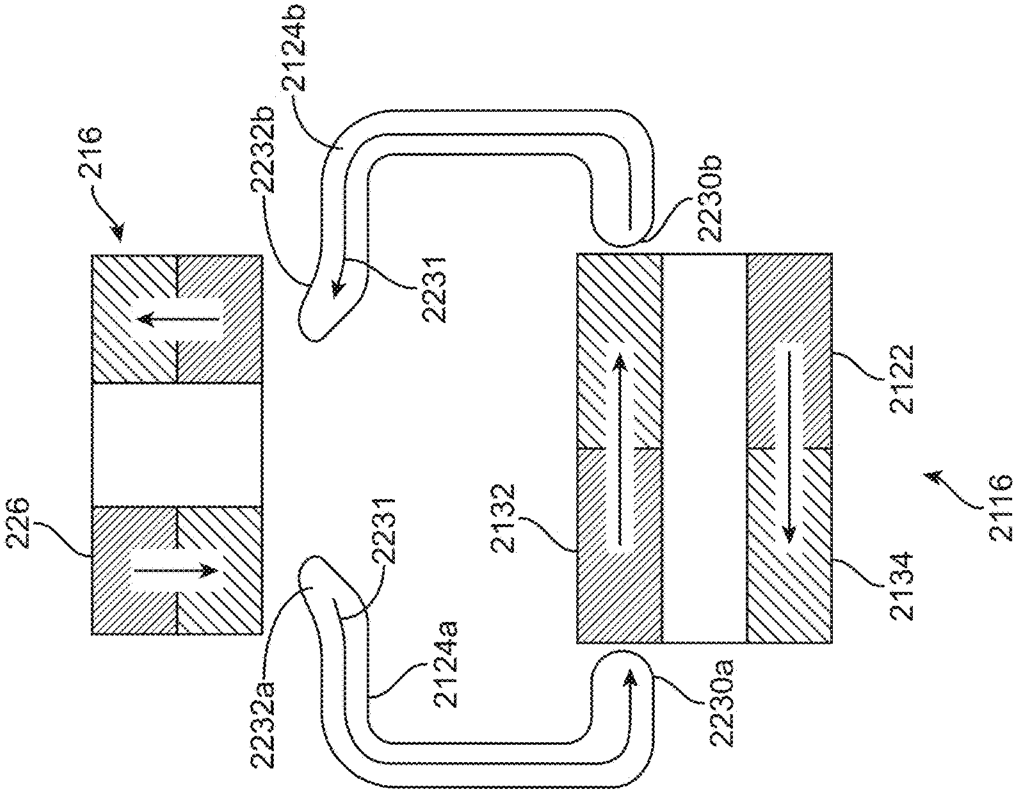
FIGS. 22A and 22B show simplified cross-section views of a bimodal alignment component in two different attachment positions according to some embodiments.
Figure 22A:
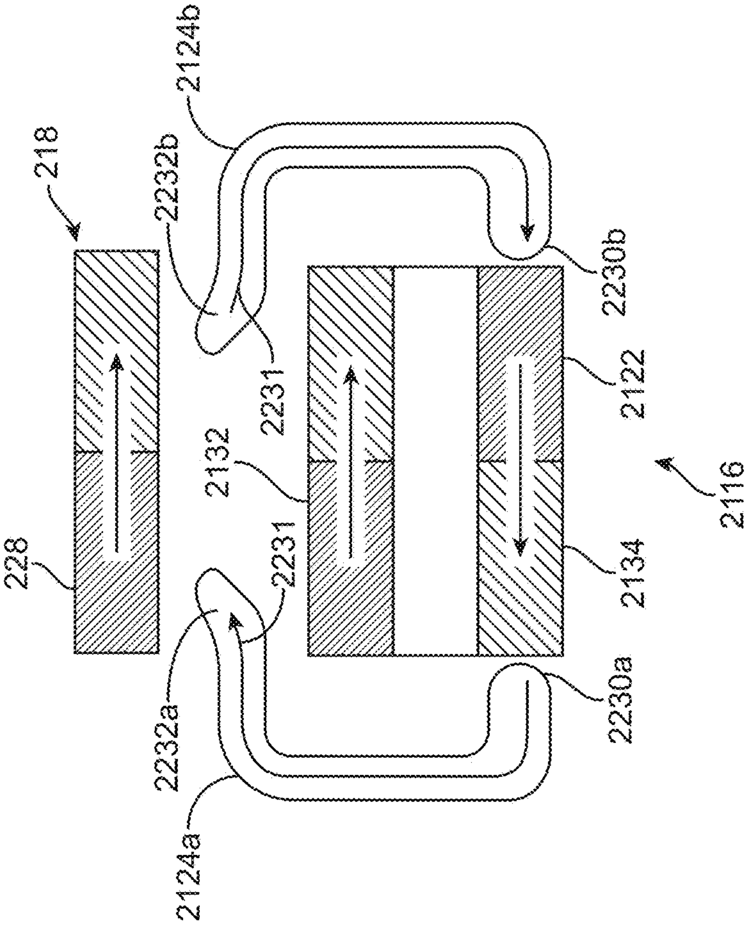

FIGS. 22A and 22B show simplified cross-section views of bimodal alignment component 2116 in two different attachment positions according to some embodiments. FIG. 22A shows bimodal alignment component 2122 in a first attachment position, which can be a position that is attractive to secondary alignment component 218. As shown, magnetic element 2122 is displaced in a proximal direction (i.e., toward secondary alignment component 218). Distal arcuate region 2134 is brought into proximity to the distal ends 2230*a*, 2230*b* of flux guides 2124*a*, 2124*b*, and magnetic flux flows through flux guides 2124*a*, 2124*b* along paths indicated by arrows 2231. Flux at the proximal ends 2232*a*, 2232*b* of flux guides 2124*a*, 2124*b* is complementary to the magnetic orientation of dipole magnet 228 of secondary alignment component 218, providing attractive magnetic force. FIG. 22B shows bimodal alignment component 2122 in a second attachment position, which can be a position that is attractive to primary alignment component 216. As shown, magnetic element 2122 is displaced in a distal direction (i.e., away from primary alignment component 216). Proximal arcuate region 2123 is brought into proximity to the distal ends 2230*a*, 2230*b* of flux guides 2124*a*, 2124*b*, and magnetic flux flows through flux guides 2124*a*, 2124*b* along paths indicated by arrows 2233 (which have the reverse direction from arrows 2231). Flux at the proximal ends 2232*a*, 2232*b* of flux guides 2124*a*, 2124*b* is complementary to the magnetic orientation of quad-pole magnet 226 of primary alignment component 216, again providing attractive magnetic force.

It will be appreciated that bimodal alignment component 2116 is illustrative and that variations and modifications are possible. Annular magnetic element 2122 can be constructed from multiple arcuate magnets, e.g., using techniques and methods described above with reference to FIGS. 2A and 2B. Thickness and radial width of annular magnetic element 2122 can be varied as desired, consistent with the dimensions of the primary and secondary alignment components. The particular size and shape of flux guides 2124*a*, 2124*b* can be modified as desired. A gap between proximal ends 2232*a*, 2232*b* allows interaction of magnetic flux with the primary or secondary alignment component, thereby increasing the attractive force. In some embodiments, the proximal ends 2232*a*, 2232*b* can be shaped to further optimize the attractive force toward the primary or secondary alignment component. Similarly to other embodiments described herein, annular magnetic element 2122 can be disposed in a recess or channel that permits axial displacement while restricting movement in other directions. Force-balancing to equalize attraction between primary and secondary alignment components can be provided, e.g., by varying the relative thicknesses of magnetized regions 2132 and 21234. Bimodal alignment component 2116 can be incorporated into a variety of bimodal devices; the incorporation can be similar to examples described above, with bimodal alignment component 2116 disposed in an appropriate area of the housing of the bimodal device.

4. Additional Embodiments

While the invention has been described with reference to specific embodiments, those skilled in the art will appreciate that variations and modifications are possible. For instance, all magnet shapes and dimensions are illustrative and may be modified. Rotational freedom can extend to a full 360-degree rotation or within a smaller range (e.g., at least 180 degrees). The designation of one type of fixed-orientation magnetic alignment component as "primary" and the other as secondary is arbitrary. Bimodal alignment components of the kind described herein can be used in a variety of magnetic alignment systems where two types of annular magnetic alignment components having fixed (and complementary) magnetic orientations exist and it is desirable to provide an annular alignment component that can attach to either type of fixed-polarity alignment component. Similarly, all labeling of magnetic poles as "north" and "south" is arbitrary and can be reversed.

Magnetic alignment components, whether of primary, secondary, or bimodal type, can be used with an inductive charging coil to facilitate alignment of the coils as described above, or a magnetic alignment component can be present in a device that does not have an inductive charging coil. Further, a portable electronic device that has an annular magnetic alignment component disposed around an inductive coil can be charged by a wireless charger device that does not have a magnetic alignment component, and conversely, a wireless charger device that has an annular magnetic alignment component disposed around an inductive coil can be used to charge a portable electronic device that has an inductive charging coil but not a magnetic alignment component. In these situations, the magnetic alignment component may not facilitate alignment between the devices, but it need not interfere with wireless power transfer.

In addition, while a portable electronic device has been described as receiving power wirelessly, those skilled in the art will appreciate that an inductive power coil may be operable to transmit as well as receive power wirelessly, and in some embodiments a portable electronic device can be reconfigurable to operate either as a transmitter or receiver for wireless power transfer. Thus, for example, some types of bimodal devices may be able to receive power from either a portable electronic device or a wireless charger that charges the portable electronic device.

In some embodiments, a primary and/or secondary magnetic alignment component can be fixed in position within a device housing. Alternatively, a primary or secondary magnetic alignment component in a device can be made movable in the axial and/or lateral direction. A movable magnetic alignment component can allow the magnets to be moved (e.g., axially) into closer proximity to increase magnetic forces holding the devices in alignment or moved away from each other to reduce the magnetic forces holding the devices in alignment. In some embodiments, allowing the magnetic alignment components to move axially away from the attachment surface of a device can reduce surface gauss when the alignment components are not in use.

Similarly, in various embodiments (including embodiments described above) a bimodal magnetic alignment component can have an additional axial degree of freedom of translational movement so that the bimodal magnetic alignment component can move away from the attachment (or proximal) surface when not attached to another device. In some embodiments, an axial degree of freedom can be provided by appropriately shaping the recesses in which the magnets are disposed. For instance, in embodiments of the kind shown in FIG. 4, 9, or 18, the recesses (432, 932, or 1832) can have a depth (axial dimension) greater than the thickness of the magnets (422, 922, or 1822) disposed therein. In embodiments of the kind shown in FIG. 21, the entire bimodal alignment component (including magnet 2122 and flux guides 2124*a*, 2124*b*) can be axially displaceable. Where a bimodal alignment component (or its constituent magnets) are axially displaceable, the magnets can be drawn toward the attachment surface by a complementary magnet when present (the complementary magnet can be, interchangeably, a primary or secondary alignment component since the magnets of the bimodal alignment component can reorient appropriately) when present and can retract away from the attachment when a complementary magnet is absent. In some embodiments, a compressible member (e.g., a spring, cantilever, or other structure capable of applying a biasing force) can be provided to bias the magnets in a preferred axial direction (e.g., away from the attachment surface), and a complementary magnet can exert an attractive force that overcomes the bias force applied by the biasing member.

Further, while it is contemplated that magnetic alignment components of the kind described herein, including bimodal alignment components, can be used to facilitate alignment between transmitter and receiver coils for wireless power transfer between devices, use of magnetic alignment components is not so limited, and magnetic alignment components, including bimodal alignment components, can be used in a variety of contexts to hold one device in relative alignment with another, regardless of whether either or both devices have inductive charging coils or other circuitry for wireless power transfer. Thus, for instance, a bimodal electronic device can but need not include an inductive charging coil.

Accordingly, although the invention has been described with respect to specific embodiments, it will be appreciated that the invention is intended to cover all modifications and equivalents within the scope of the following claims.

What is claimed is:

1. An electronic device comprising:

a housing including an attachment surface; and a bimodal magnetic alignment component disposed within the housing, the bimodal magnetic alignment component including a plurality of magnets arranged in a ring in a plane parallel to the attachment surface, each magnet having a magnetic orientation, each magnet being mounted in the housing such that each magnet freely rotates in response to external magnetic fields between a first attachment position in which a magnetic orientation of the magnet is in a first direction and a second attachment position in which the magnetic orientation of the magnet is in a second direction opposite the first direction, wherein when a first external magnetic field is proximate to the attachment surface, the magnets rotate into the first attachment position and when a second external magnetic field complementary to the first external magnetic field is proximate to the attachment surface, the magnets rotate into the second attachment position.

2. The electronic device of claim 1 wherein each magnet is a cylindrical magnet having an axis oriented parallel to an axis of the ring and wherein each magnet freely rotates about the axis of the cylindrical magnet.

3. The electronic device of claim 2 wherein each cylindrical magnet is a dipole magnet having a magnetic orientation parallel to a diameter of the magnet.

4. The electronic device of claim 2 wherein the housing includes a plurality of cylindrical recesses arranged to define the ring and each cylindrical magnet is disposed in a different one of the cylindrical recesses.

5. The electronic device of claim 4 wherein each cylindrical magnet is freely rotatable in the cylindrical recess in which the cylindrical magnet is disposed.

6. The electronic device of claim 4 wherein at least a first one of the cylindrical magnets is nonrotatably disposed in a first one of the cylindrical recesses and wherein at least some of the cylindrical magnets are freely rotatable in the cylindrical recesses in which the at least some of the cylindrical magnets are disposed.

* * * * *